United States Patent
Takenaga et al.

(10) Patent No.: US 11,655,364 B2
(45) Date of Patent: May 23, 2023

(54) THERMOPLASTIC RESIN FILM, METAL PLATE COATED WITH THERMOPLASTIC RESIN, AND METAL CONTAINER COATED WITH THERMOPLASTIC RESIN

(71) Applicants: TOYO KOHAN CO., LTD., Tokyo (JP); TOYO SEIKAN CO., LTD., Tokyo (JP)

(72) Inventors: Tomoyasu Takenaga, Kudamatsu (JP); Kazuhiro Nishida, Kudamatsu (JP); Satoshi Kawamura, Kudamatsu (JP); Kousuke Sasaki, Kudamatsu (JP); Shuhei Hiromori, Yokohama (JP); Kenji Yanada, Yokohama (JP); Mitsuhide Aihara, Yokohama (JP)

(73) Assignees: TOYO SEIKAN CO., LTD., Tokyo (JP); TOYO KOHAN CO., LTD., Tokyo (JP)

( * ) Notice: Subject to any disclaimer, the term of this patent is extended or adjusted under 35 U.S.C. 154(b) by 90 days.

(21) Appl. No.: 17/057,960

(22) PCT Filed: May 21, 2019

(86) PCT No.: PCT/JP2019/020033
§ 371 (c)(1),
(2) Date: Nov. 23, 2020

(87) PCT Pub. No.: WO2019/225574
PCT Pub. Date: Nov. 28, 2019

(65) Prior Publication Data
US 2021/0189117 A1    Jun. 24, 2021

(30) Foreign Application Priority Data
May 23, 2018    (JP) .............. JP2018-099226

(51) Int. Cl.
*C08L 67/03* (2006.01)
*B32B 15/09* (2006.01)
(Continued)

(52) U.S. Cl.
CPC .............. *C08L 67/03* (2013.01); *B32B 15/09* (2013.01); *B32B 27/32* (2013.01); *B32B 27/36* (2013.01);
(Continued)

(58) Field of Classification Search
CPC .......... C08L 67/03; C08L 23/06; C08L 23/12; C08L 23/16; C08L 33/08; C08L 33/10;
(Continued)

(56) References Cited

U.S. PATENT DOCUMENTS

| | | | | |
|---|---|---|---|---|
| 6,045,902 A | * | 4/2000 | Imanishi | C08J 5/18 428/338 |
| 6,054,209 A | * | 4/2000 | Imanishi | B29D 7/01 525/437 |

(Continued)

FOREIGN PATENT DOCUMENTS

| | | | |
|---|---|---|---|
| CA | 2447667 A1 | * | 9/2003 |
| EP | 0644226 A | | 3/1995 |

(Continued)

*Primary Examiner* — Tamra L. Dicus
(74) *Attorney, Agent, or Firm* — Browdy and Neimark, PLLC

(57) ABSTRACT

[Problem]
To provide a thermoplastic resin film excellent in impact resistance, formability and trimmability when forming a container, productivity, and the like, and a thermoplastic resin-coated metal sheet.
[Solution]
A thermoplastic resin film contains 70 to 97 wt % of a thermoplastic polyester resin component and 3 to 30 wt % of a polyolefin resin component. The polyolefin resin com- (Continued)

ponent contains one or more polyolefin resins selected from the group consisting of nonpolar polyolefin resins and polyolefin resins having ester-containing functional groups in side chains thereof. The polyolefin resin component is dispersed, in the thermoplastic polyester resin component, in a fibrous form having an average length of 5 to 300 μm in a machine direction of the film, an average length of 0.2 to 5 μm in a thickness direction of the film, and an aspect ratio of 8 or greater.

7 Claims, 10 Drawing Sheets

(51) Int. Cl.
  *B32B 27/32* (2006.01)
  *B32B 27/36* (2006.01)
  *C08L 23/06* (2006.01)
  *C08L 23/12* (2006.01)
  *C08L 23/16* (2006.01)
  *C08L 33/08* (2006.01)
  *C08L 33/10* (2006.01)

(52) U.S. Cl.
  CPC ............... *C08L 23/06* (2013.01); *C08L 23/12* (2013.01); *C08L 23/16* (2013.01); *C08L 33/08* (2013.01); *C08L 33/10* (2013.01); *B32B 2262/0207* (2013.01); *B32B 2262/0223* (2013.01); *B32B 2262/0253* (2013.01); *B32B 2264/0214* (2013.01); *B32B 2264/301* (2020.08); *B32B 2264/302* (2020.08); *B32B 2311/24* (2013.01); *B32B 2323/04* (2013.01); *B32B 2323/10* (2013.01); *B32B 2367/00* (2013.01)

(58) Field of Classification Search
  CPC ......... C08L 67/02; B32B 15/09; B32B 27/32; B32B 27/36; B32B 2262/0207; B32B 2262/0223; B32B 2262/0253; B32B 2264/0214; B32B 2264/301; B32B 2264/302; B32B 2311/24; B32B 2323/04; B32B 2323/10; B32B 2367/00; B32B 2250/02; B32B 2250/03; B32B 2250/04; B32B 2250/05; B32B 2255/26; B32B 2270/00; B32B 2419/00; B32B 1/02; B32B 7/02; B32B 27/18; B32B 27/20; B32B 2255/06; B32B 15/20; B32B 27/08; B32B 2307/54; B32B 2307/558; B32B 2605/00; B32B 7/12; B32B 2307/748; B32B 2439/66; B32B 2439/70; B65D 65/40; C08J 2367/02; C08J 2423/06; C08J 2423/08; C08J 2423/12; C08J 2423/16; C08J 2467/02; C08J 5/18
  See application file for complete search history.

(56) References Cited

U.S. PATENT DOCUMENTS

| | | | |
|---|---|---|---|
| 6,783,825 | B1 | 8/2004 | Ohishi et al. |
| 9,114,599 | B2* | 8/2015 | Mase .................... B32B 37/06 |
| 11,292,908 | B2 | 4/2022 | Kawamura et al. |
| 2005/0191483 | A1* | 9/2005 | Yoshida .................. B32B 27/08 |
| | | | 428/332 |
| 2008/0176968 | A1* | 7/2008 | VanSumeren .......... C08J 9/0061 |
| | | | 521/97 |

FOREIGN PATENT DOCUMENTS

| | | |
|---|---|---|
| EP | 1 378 344 A1 | 7/2004 |
| JP | 6220220 A | 8/1994 |
| JP | 3284741 B2 | 5/2002 |
| JP | 2004-83736 A | 3/2004 |
| JP | 3768145 B2 | 4/2006 |
| JP | 3858140 B2 | 12/2006 |
| JP | 3895924 B2 | 3/2007 |
| JP | 2008-285621 A | 11/2008 |
| WO | 2018-016439 A1 | 1/2018 |

* cited by examiner

[FIG. 1]
(a) MD ⇒
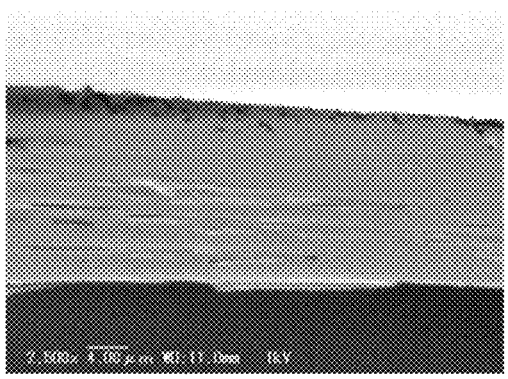
(b) TD ⇒
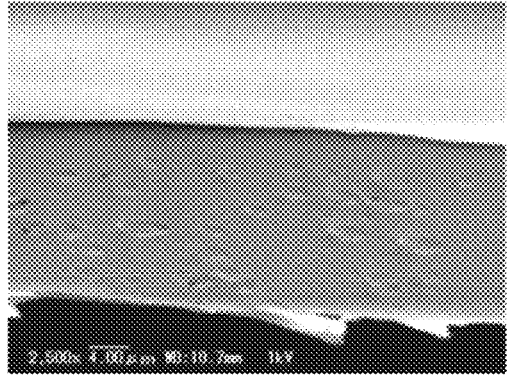
(c) MD ⇒
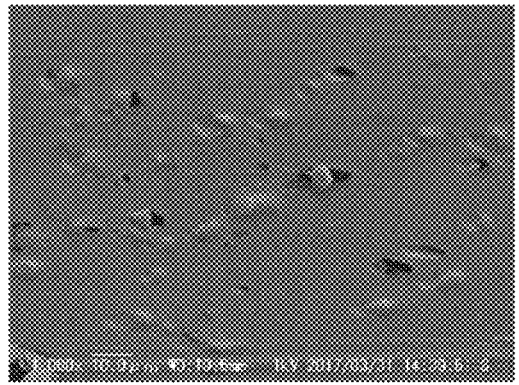
(d) TD ⇒
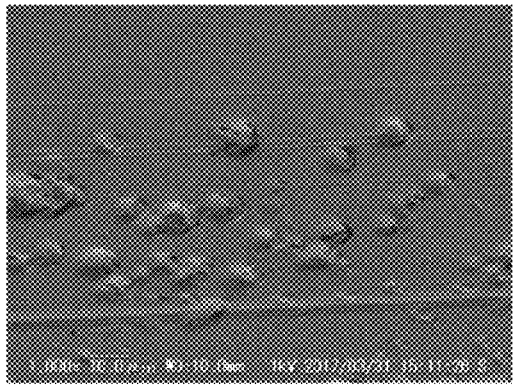

[FIG. 2]
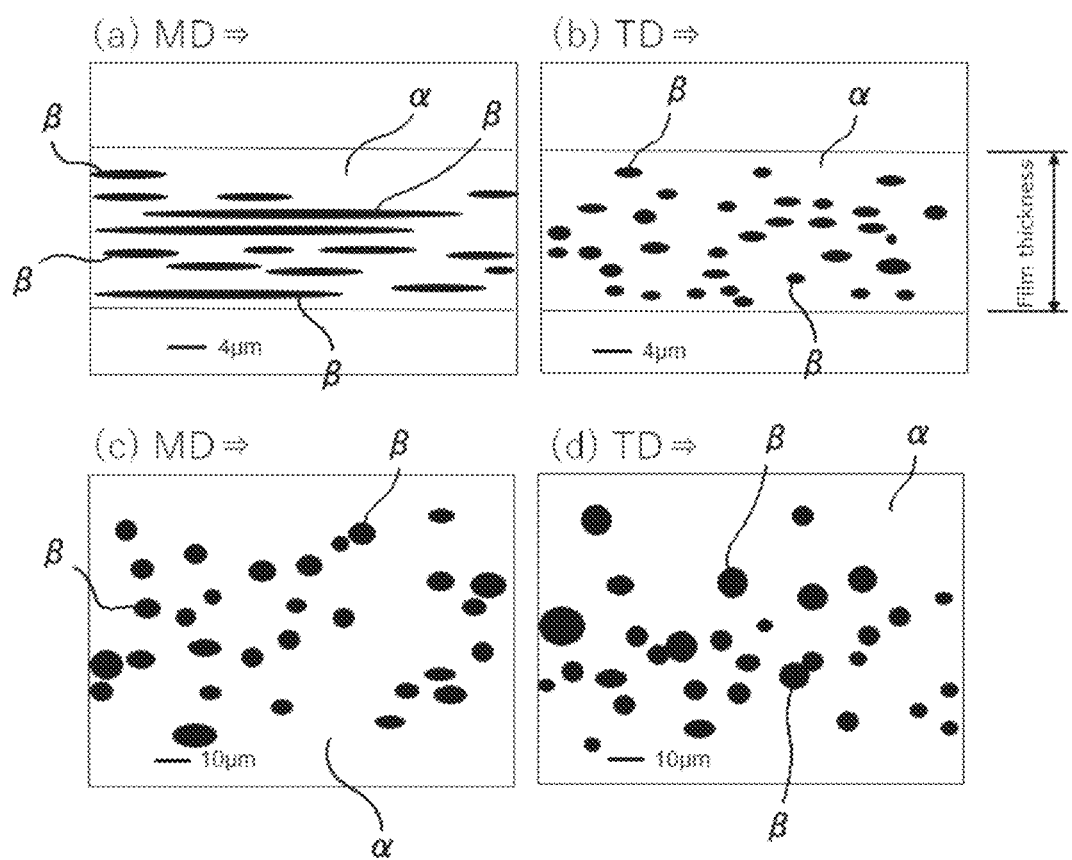

[FIG. 3]
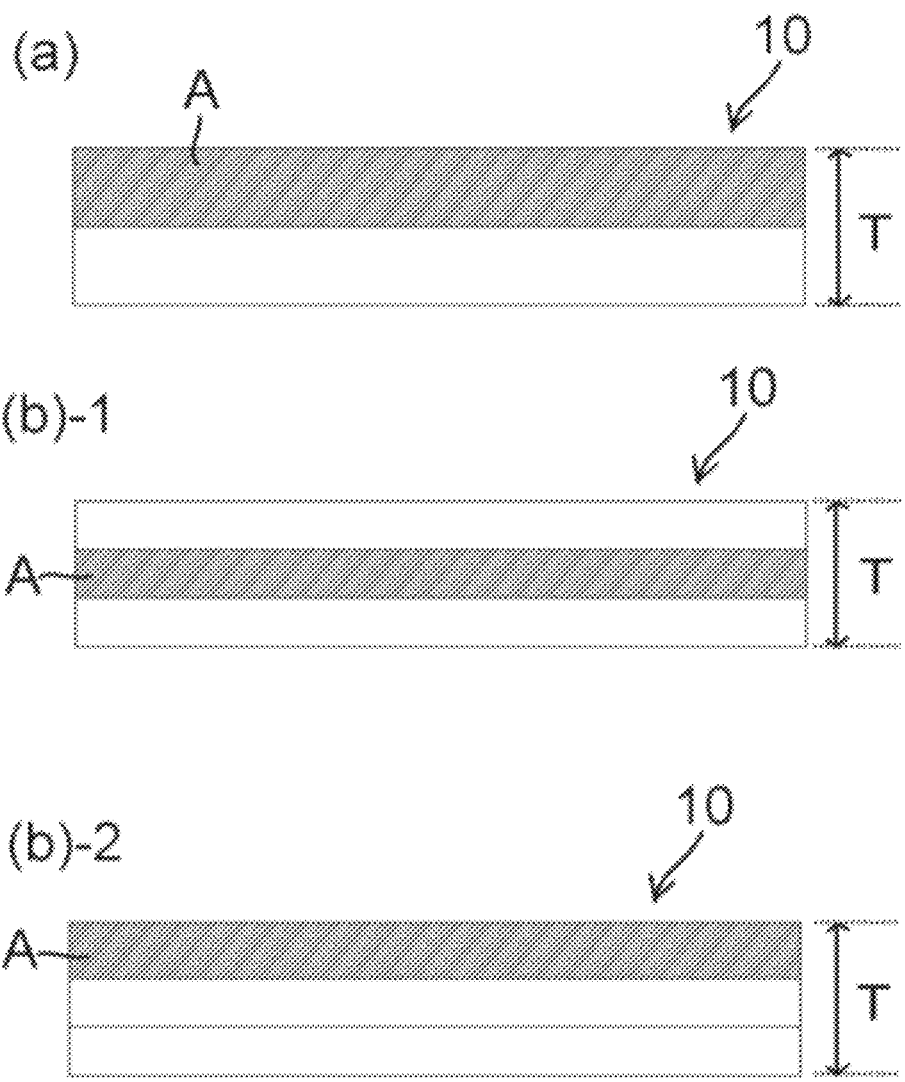

[FIG. 4]
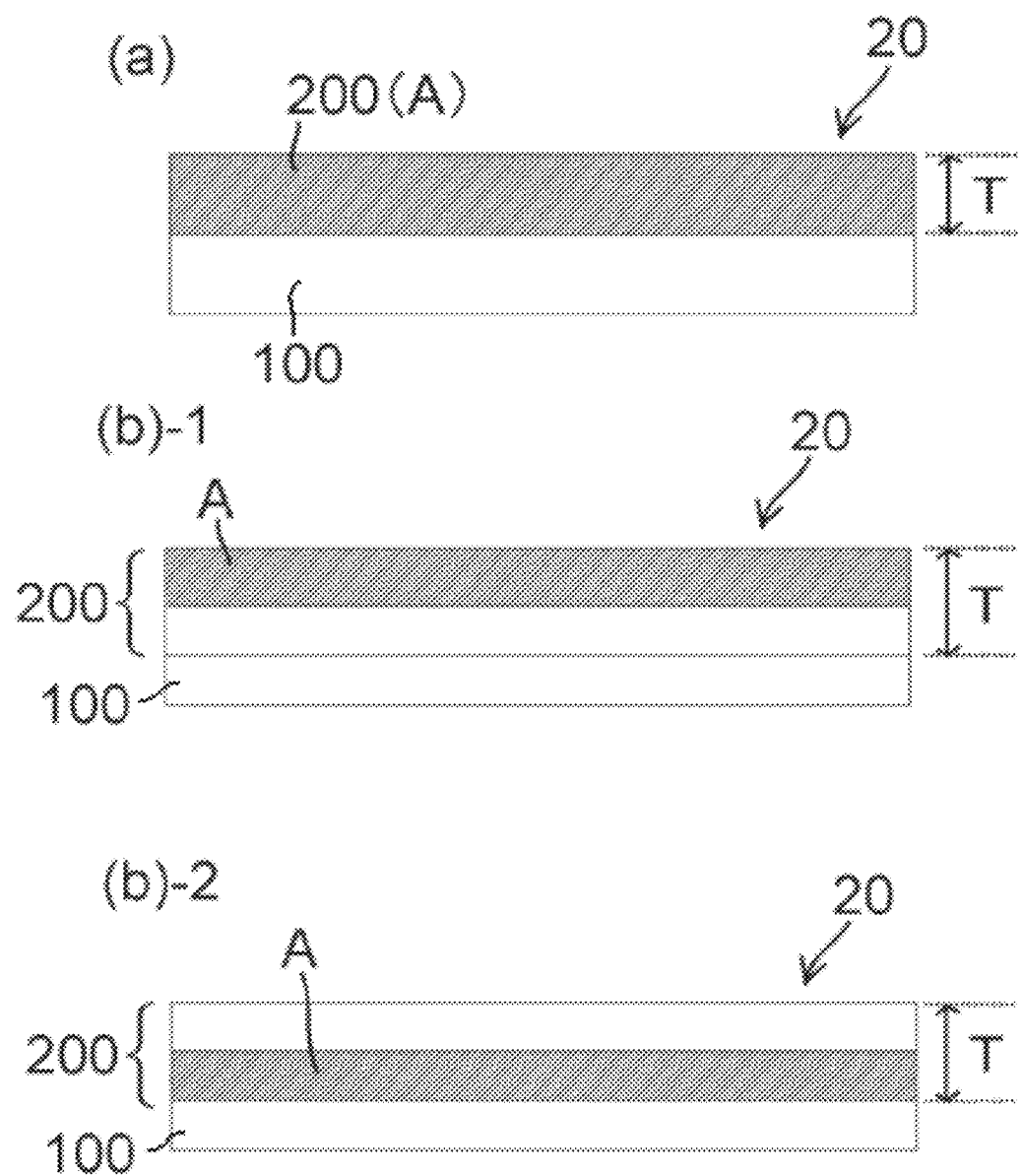

[FIG. 5]
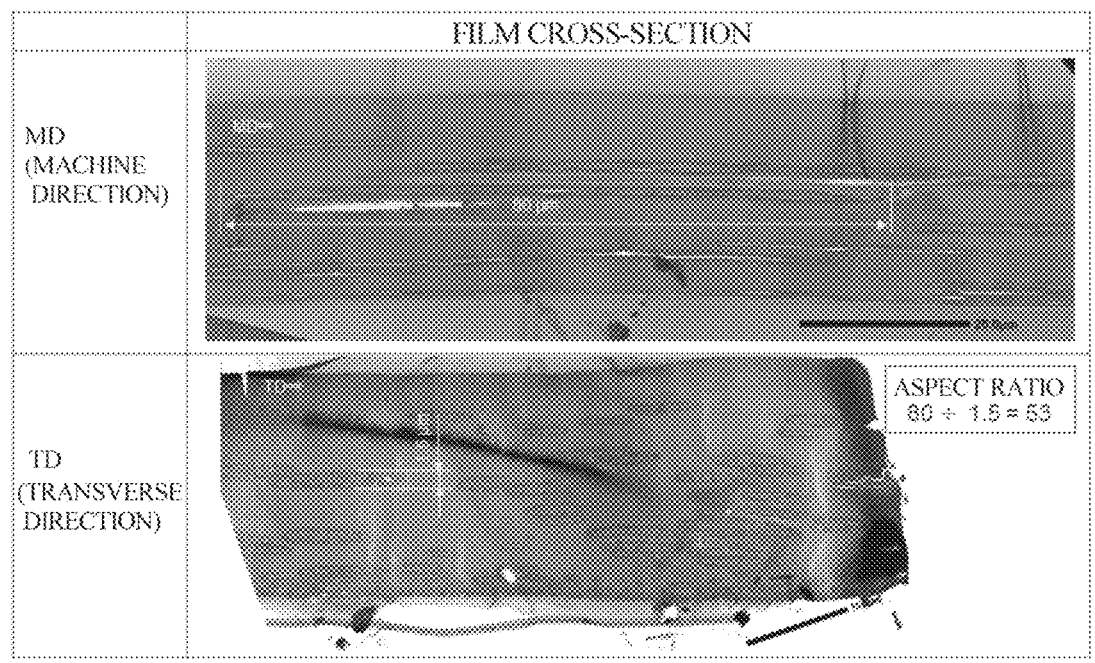

[FIG. 6]
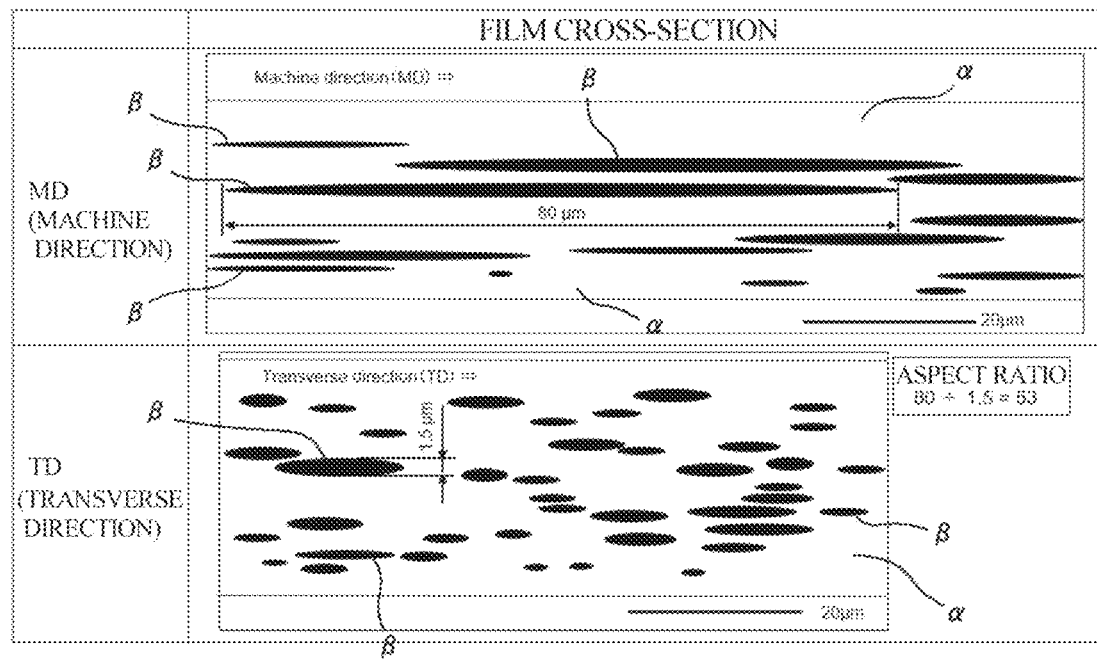
[FIG. 7]
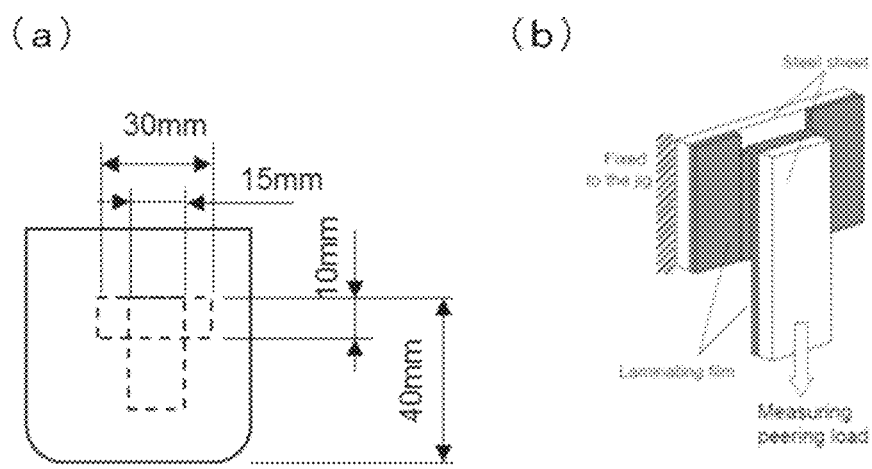
(a) Fig. Draw & Redraw cup
(b) Fig. Out-Line of 180° peel test

[FIG. 8]
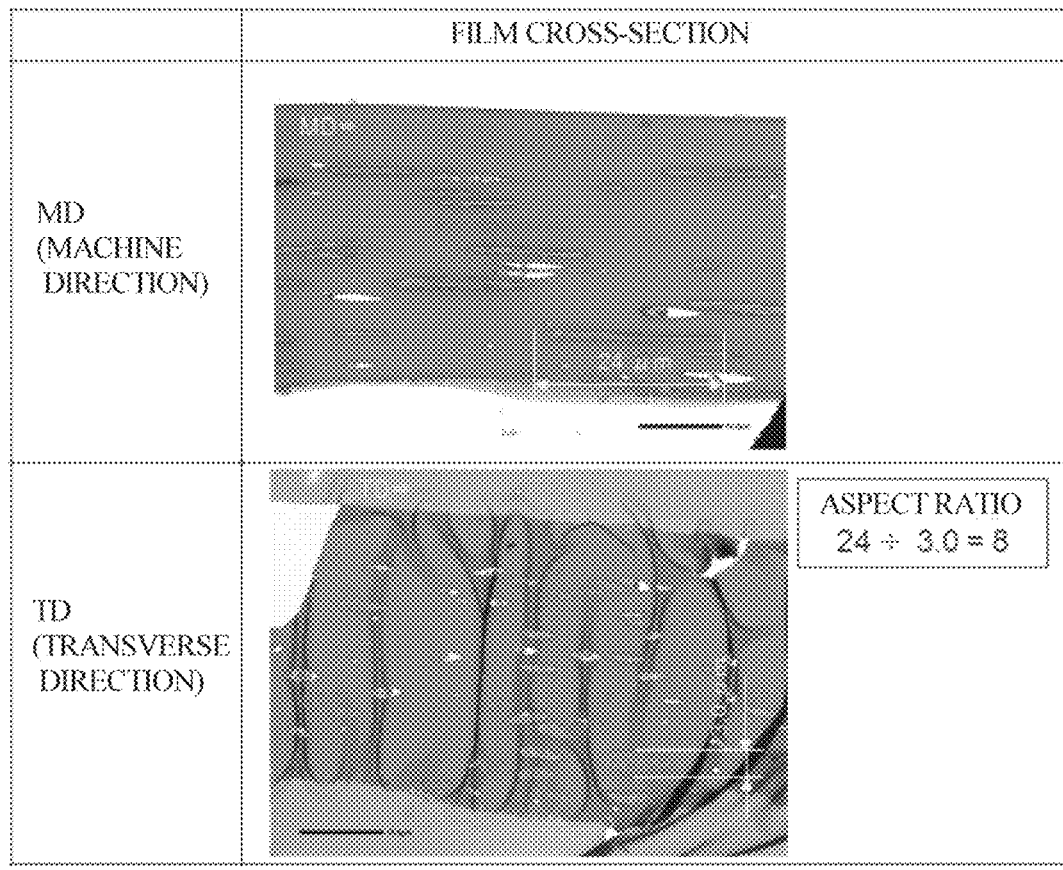

[FIG. 9]
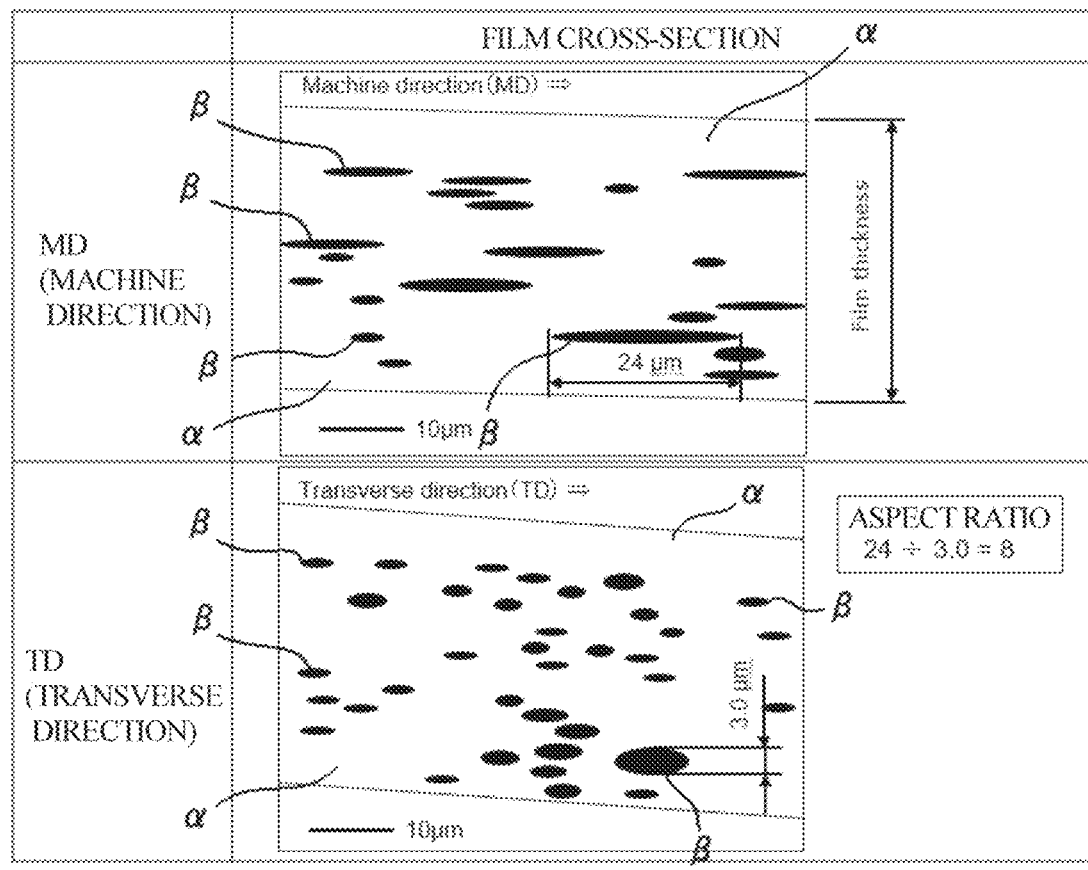

[FIG. 10]
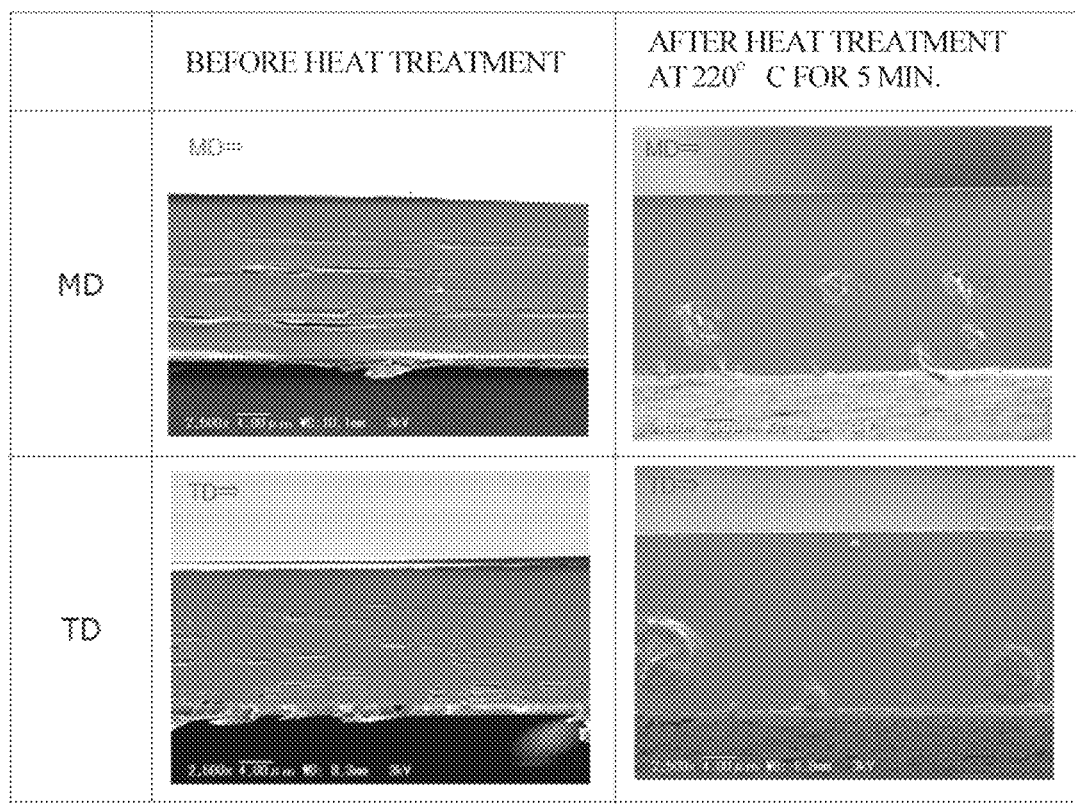

[FIG. 11]
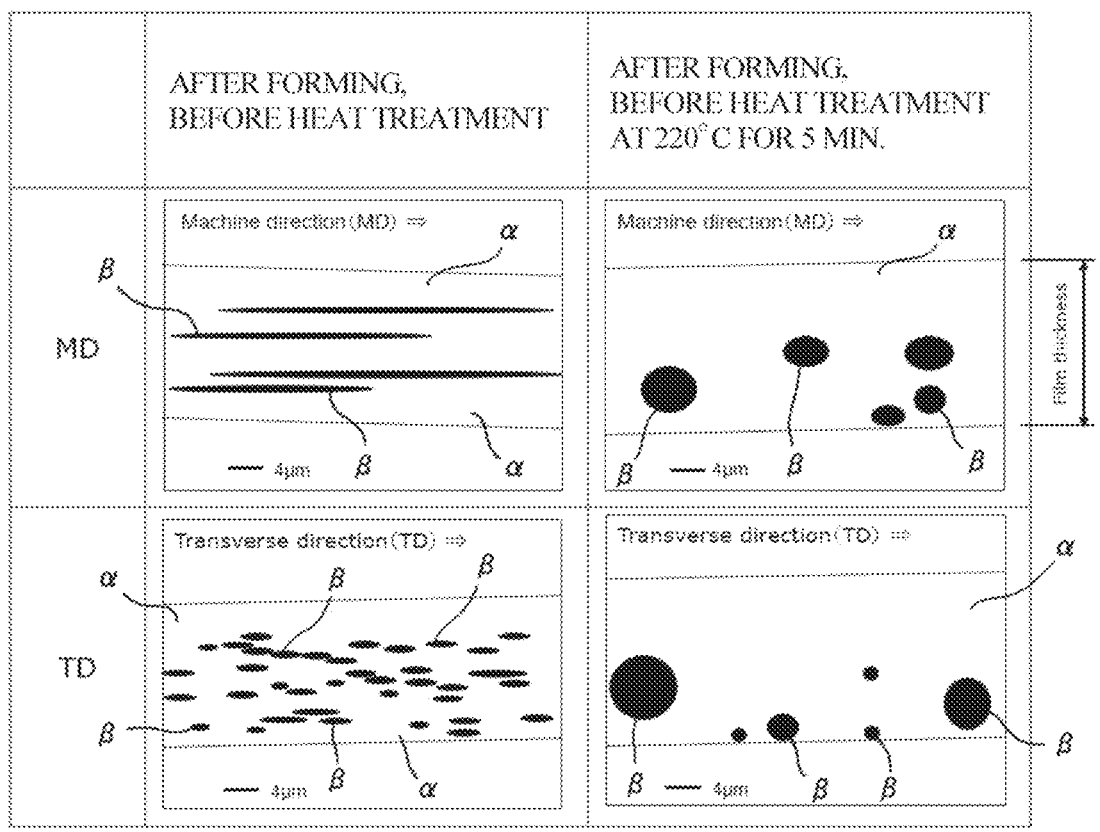

THERMOPLASTIC RESIN FILM, METAL PLATE COATED WITH THERMOPLASTIC RESIN, AND METAL CONTAINER COATED WITH THERMOPLASTIC RESIN

TECHNICAL FIELD

The present invention relates to a thermoplastic resin film, a thermoplastic resin-coated metal sheet, and a thermoplastic resin-coated metal container.

BACKGROUND ART

As materials for containers such as metal cans for beverages or foods, resin-coated metal sheets with a thermoplastic resin film laminated on surfaces of the metal sheets are conventionally known. As the thermoplastic resin film, a polyester film or the like is used.

In a container such as a metal can for a beverage or food, such as those described above, a resin laminated especially on the side of an inner wall thereof needs to withstand an impact when the container is bumped or dropped. If the resin on the side of the inner wall cracks or peels off upon reception of the impact, the cracked or peeled-off portion becomes a cause of corrosion so that the quality of the contents may be impaired significantly.

As one of methods for improving the impact resistance of a polyester film, there is known a method that mixes (may hereinafter be also called "blended") and disperses a polyolefin resin in a polyester resin (PTL 1). The polyolefin resin is a material excellent in impact resistance, so that its dispersion in the polyester resin can improve the impact resistance of the resulting resin as a whole.

As a conventional problem, however, a resin in which a polyester resin and a polyolefin resin are mixed together (may hereinafter be also called "blend resin") involves a problem that these resins have low compatibility each other. In other words, the blend resin of the polyester resin and the polyolefin resin has low adhesion at the interface between both the resins. If a container is manufactured using such a blend resin, the interface between the polyester resin and the polyolefin resin may therefore act as a starting point of breakage during forming, thereby possibly causing cracking or shaving of a resin film.

In view of the above-mentioned formability and adhesion problems of the polyester resin and the polyolefin resin, PTL 2, for example, discloses a film for a laminated metal sheet. The film is formed from a mixed resin with a particulate resin, which includes polyethylene, polypropylene or the like and has an average particle size of 0.01 to 5 µm, dispersed in a polyester resin containing ethylene terephthalate or the like as a main skeleton. Problems of such a film are to obtain excellent formability, impact resistance, and post-forming adhesion. As an application of such a film, use for application especially in thin, deep-drawn cans, where it is subjected to severe forming, is described.

Further, PTL 3 discloses a resin film for coating a metal sheet. In the resin film, a rubber elastomer resin as a polyolefin resin is micro-dispersed with an equivalent sphere diameter of 1 µm or smaller in a polyester resin. In addition, the polyolefin resin is covered at surfaces thereof with a vinyl polymer having polar groups. Problems of such a film are to obtain excellent impact resistance, formability and the like. As an application of such a film, use in resin-coated metal containers, which are obtained by forming a resin-coated metal sheet coated with such a resin film as described above, is described.

PTL 4 discloses a metal sheet coated with a thermoplastic resin, which includes a thermoplastic resin composition of polybutylene terephthalate and a polyolefin resin component blended together. The content of the polyolefin resin component in the thermoplastic resin is 5 to 30 wt %, and the polyolefin resin component in a coating layer exists dispersed with a size of 1 to 10 µm in a machine direction and 0.1 to 2 µm in a direction perpendicular to the machine direction.

CITATION LIST

Patent Literature

[PTL 1]
Japanese Patent No. 3284741
[PTL 2]
Japanese Patent No. 3858140
[PTL 3]
Japanese Patent No. 3895924
[PTL 4]
Japanese Patent No. 3768145

SUMMARY

Technical Problems

The techniques disclosed in PTL 2 to PTL 4 mentioned above are all based on a concept that is to resolve the above-described problems by dispersing a polyolefin resin with an extremely small size in a polyester resin. In other words, the above-described concept is to resolve the problem of adhesion with the polyester resin through an increase of the total surface area of the polyolefin resin, which is to be dispersed, by dividing a polyolefin resin component into an extremely small size. According to these conventional techniques, however, the micro-dispersion leads to a relative reduction in impact resistance so that as a countermeasure, a need arises to increase the blend amount of the polyolefin resin. If the blend amount of the polyolefin resin is increased, however, a problem arises such that the strippability of cans is impaired. It is, therefore, difficult to satisfy both formability and impact resistance. Especially in cans, such as drawn and ironed cans, manufactured under severe forming conditions, no sufficient impact resistance has been ensured yet.

PTL 3 also discloses a technique that, based on a modified polyolefin resin with polar groups introduced therein, increases the adhesion by using the reactivity between a polyester resin and the polar groups of the modified polyolefin resin. However, such a modified polyolefin resin has problems in that its reactivity is hardly controllable and its thermal stability is inferior. Described specifically, when continuously manufacturing a film by mixing the modified polyolefin resin and the polyester resin, a problem arises in that their reaction products (may hereinafter be also called "blobbing") occur. If the "blobbing" has mixed in the films so manufactured, the "blobbing" becomes a cause of pitting in the resin when containers are manufactured. Therefore, the "blobbing" needs to be removed in the course of the manufacture, so that the "blobbing" significantly lowers the productivity and has become a cause for an increase in cost.

There is also a technique to add an oxidation inhibitor such as polyphenol or vitamin E (tocopherol) for the suppression of occurrence of the above-described "blobbing." This technique, however, leads to a complex resin composition, whereby a need arises for special production equipment. There is another problem such that such an additive is scorched in an extruder and becomes a cause of "blobbing." Hence, there is still a room for improvements.

With the foregoing problems in view, the present inventors diligently sought a technique that could be used to stably conduct long-run production of films with a blend resin of a polyester resin and a polyolefin resin. As a result, it was found that the above-described problems can be resolved by using a specific polyolefin resin and dispersing it in a particular blend amount and in a specific shape, leading to the present invention.

Solution to Problems

Described specifically, the present invention has the following characteristics:

(1) A thermoplastic resin film according to the present invention is characterized in that it contains 70 to 97 wt % of a thermoplastic polyester resin component and 3 to 30 wt % of a polyolefin resin component, the polyolefin resin component contains one or more polyolefin resins selected from the group consisting of nonpolar polyolefin resins and polyolefin resins having ester-containing functional groups in side chains thereof, and the polyolefin resin component is dispersed, in the thermoplastic polyester resin component, in a fibrous form having an average length of 5 to 300 μm in a machine direction of the film, an average length of 0.2 to 5 μm in a thickness direction of the film and an aspect ratio of 8 or greater.

(2) In (1) described above, the nonpolar polyolefin resins may preferably be any of polyethylene, polypropylene, and ethylene-propylene copolymer.

(3) In (1) or (2) described above, the polyolefin resins having the ester-containing functional groups in the side chains thereof may preferably be any of ethylene-methyl methacrylate copolymer, ethylene-ethyl acrylate copolymer, and ethylene-methyl acrylate copolymer.

(4) In any one of (1) to (3) described above, the thermoplastic polyester resin may preferably contain one or more of polyethylene terephthalate (PET), polyethylene terephthalate/isophthalate copolymer (PET/IA), polybutylene terephthalate (PBT), and polyethylene naphthalate (PEN).

(5) In any one of (1) to (4) described above, the thermoplastic resin film may further include, on at least one side of the thermoplastic resin film, a thermoplastic polyester resin layer of a kind different from the thermoplastic resin film.

(6) A thermoplastic resin-coated metal sheet according to the present invention is characterized by including a metal sheet and the thermoplastic resin film according to any one of (1) to (5) laminated on at least one side of the metal sheet.

(7) A thermoplastic resin-coated metal container according to the present invention is characterized in that it includes a thermoplastic resin layer on a side of at least an inner wall of the container, the thermoplastic resin layer contains 70 to 97 wt % of a thermoplastic polyester resin component and 3 to 30 wt % of a polyolefin resin component, the polyolefin resin component contains one or more polyolefin resins selected from the group consisting of nonpolar polyolefin resins and polyolefin resins having ester-containing functional groups in side chains thereof, and the polyolefin resin component is dispersed, in the thermoplastic polyester resin component, in the fibrous form having an average length of 5 to 300 μm in a machine direction of the film, an average length of 0.2 to 5 μm in a thickness direction of the film and an aspect ratio of 8 or greater.

(8) In (7) described above, at least a portion of the polyolefin resin component may preferably be dispersed in a particulate form having an average particle size of 2 to 10 μm, in the thermoplastic polyester resin component.

Advantageous Effects of Invention

According to the thermoplastic resin film of the present invention, stable long-run production is possible without occurrence of reaction products (blobbing) when manufacturing the resin film with the polyolefin resin dispersed in the polyester resin. It is also possible to improve the adhesion at an interface between both the resins, and to improve the formability when forming a container. In addition, in a trimming step that removes an unnecessary part of the film at an open end, for example, after forming a can body on a container manufacturing line, it is possible, coupled with an improvement in the cuttability of the film, to suppress a phenomenon that the unnecessary part of the film at the open end remains uncut at a free end of the can due to a failure in cutting the film at the time of trimming.

According to the present invention, it is also possible to provide the thermoplastic resin-coated metal sheet and the thermoplastic resin-coated metal container, both of which use the above-described thermoplastic resin film.

BRIEF DESCRIPTION OF DRAWINGS

FIG. 1(a) is a photo presenting a cross-sectional image (in a machine direction) of a thermoplastic resin film according to an embodiment, FIG. 1(b) is a photo presenting a cross-sectional image (in a direction perpendicular to the machine direction) of the thermoplastic resin film according to the embodiment, FIG. 1(c) is a photo presenting a cross-sectional image (in a machine direction) of a film shortly after delivery from a T-die when the thermoplastic resin according to the present invention is allowed to flow down, and FIG. 1(d) is a photo presenting a cross-sectional image (in a direction perpendicular to the machine direction of the film) shortly after delivery from the T-die when the thermoplastic resin according to the present invention is allowed to flow down.

FIG. 2 presents schematic representations schematically illustrating, based on the photos presented in FIG. 1, dispersion states or the like of a polyolefin resin in a polyester resin.

FIG. 3 presents schematic diagrams illustrating configurations of multilayer films 10 in thermoplastic resin films of the embodiment.

FIG. 4 presents schematic diagrams illustrating lamination states of thermoplastic resin-coated metal sheets 20 of the embodiment.

FIG. 5 presents photos illustrating cross-sectional states of a film of Example 1.

FIG. 6 presents schematic representations schematically illustrating, based on the photos presented in FIG. 5, a dispersion state of a polyolefin resin in a polyester resin film.

FIG. 7 presents schematic diagrams illustrating an outline of the method of a 180° peel test.

FIG. 8 presents photos illustrating cross-sectional states of a film of Example 4.

FIG. 9 presents schematic representations schematically illustrating, based on the photos presented in FIG. 8, a dispersion state of a polyolefin resin in a polyester resin.

FIG. 10 presents photos illustrating cross-sectional states of a film before and after a heat treatment in Example 24.

FIG. 11 presents schematic representations schematically illustrating, based on the photos presented in FIG. 10, dispersion states of a polyolefin resin in a polyester resin.

DESCRIPTION OF EMBODIMENT

The present invention will hereinafter be described in more detail by the following embodiment. It is to be noted that the present invention should not be limited to or by the following embodiment.

[Thermoplastic Resin Film]

A thermoplastic resin film in a first embodiment is a resin prepared by mixing (blending) a thermoplastic polyester resin component and a polyolefin resin component together. In particular, the thermoplastic resin contains 70 to 97 wt % of the thermoplastic polyester resin component and 3 to 30 wt % of the polyolefin resin component, and the polyolefin resin component contains one or more polyolefin resins selected from the group consisting of nonpolar polyolefin resins and polyolefin resins having ester-containing functional groups in side chains thereof.

Examples of the thermoplastic polyester resin in the embodiment include, but are not limited to, polyethylene terephthalate, polybutylene terephthalate, polyethylene naphthalate, and the like.

In the embodiment, the thermoplastic polyester resin may have a copolymerization component.

The copolymerization component may contain, as dicarboxylic acid component or components, one or more of terephthalic acid, isophthalic acid, orthophthalic acid, p-β-oxyethoxybenzoic acid, naphthalene-2,6-dicarboxylic acid, diphenoxyethane-4,4'-dicarboxylic acid, monosodium 5-sulfoisophthalate, hexahydroterephthalic acid, adipic acid, sebacic acid, trimellitic acid and pyromellitic acid.

The thermoplastic polymer resin component may also contain, as glycol component or components, one or more of ethylene glycol, propylene glycol, 1,4-butanediol, diethylene glycol, 1,6-hexylene glycol, cyclohexane dimethanol, bisphenol A ethylene oxide addition product, and the like.

It is to be noted that as the thermoplastic polyester resin in the embodiment, a single kind of thermoplastic polyester resin may be used, or two or more kinds of thermoplastic polyester resins may be used as a blend.

In particular, the thermoplastic polyester resin in the embodiment may preferably contain one or more of polyethylene terephthalate (PET), polyethylene terephthalate/polyethylene isophthalate copolymer (PET/IA), polybutylene terephthalate (PBT), and polyethylene naphthalate (PEN).

It is to be noted that in the polyethylene terephthalate/polyethylene isophthalate copolymer, the copolymerized amount of isophthalic acid may hereinafter be expressed in terms of a numerical value. In the case of a copolymer in which isophthalic acid has been copolymerized at 2 moly, for example, the copolymer will be described as "PET/IA2."

On the other hand, the polyolefin resin in the embodiment is characterized by containing one or more polyolefin resins selected from the group consisting of nonpolar polyolefin resins and polyolefin resins having ester-containing functional groups in side chains thereof.

It is to be noted that in the embodiment, polyolefin resin or resins such as those described above are used for reasons as will be described hereinafter.

Described specifically, in the conventional techniques, the problem of adhesion between a polyolefin resin and a polyester resin is resolved by increasing the total surface area of the polyolefin resin through dispersion of the polyolefin resin as extremely small particles in the polyester resin as mentioned above. As an alternative, the problem of adhesion between both the resins is resolved using the reactivity of a polyolefin resin, which has polarity, with a polyester.

On the other hand, the embodiment, totally opposite to the conventional techniques, selects a nonpolar or low polar polyolefin resin, and disperses it with a coarse size, which is not contemplated in the conventional technique, in a fibrous form in a polyester resin. As a consequence, the embodiment has made it possible to resolve the problem of adhesion between the both the resins by increasing the surface area of the polyolefin resin while retaining good impact resistance. Moreover, the polyolefin resin dispersed with the coarse size in the fibrous form acts as starting points of breakage to provide good cuttability for a film, thereby making improvements in trimmability on the container manufacturing line, specifically enabling to resolve the problem at the time of trimming that an unnecessary part of the film at an open end remains uncut at a free end of a can due to a failure in cutting the film.

The nonpolar or low polar polyolefin resin for use in the embodiment is low in the reactivity to the thermoplastic polyester resin, and therefore does not cause the problem of blobbing at the time of manufacture of a film, that is, the conventional problem.

Further, the mixing of the nonpolar or low polar polyolefin resin in the polyester resin leads to a film of excellent stability after the heated and melted resin is extruded from an extruder at the time of manufacture of a resin film, because the melted resin can remain having a large melt tension owing to the mixing of the polyolefin resin. As a result, the speed of film manufacture can be increased, and further the workability of direct coating that directly coats the melted resin onto a sheet is very improved. Accordingly, the mixing of the polyolefin resin also has a merit from the viewpoint of cost.

As a further merit, it is also mentioned that the addition of a lubricant is obviated. Described specifically, in the manufacture of a general polyester film, a lubricant such as silica is added to ensure slipperiness of the film. In the embodiment, on the other hand, slipperiness can be ensured by the polyolefin resin dispersed with a coarse size in a fibrous form, so that no lubricant is needed and a reduction in cost is possible.

As described above, the embodiment has made it possible to concurrently resolve all the problems in the manufacture of a film, that is, the manufacturing stability, the formability at the time of processing, and the impact resistance after manufacture of the container. In addition, the embodiment can also resolve the problem of trimmability on the container manufacturing line.

A description will next be made in detail about the polyolefin resin in the embodiment.

The nonpolar polyolefin resin in the embodiment is a polyolefin resin having neither a polar component nor a hydrogen bonding component. Particularly preferred is, but is not limited to, one of polyethylene, polypropylene, or ethylene-propylene copolymer.

On the other hand, particularly preferred as the polyolefin resin having the ester-containing functional groups in the side chains thereof in the embodiment is, but is not limited to, one of ethylene-methyl methacrylate copolymer, ethylene-ethyl acrylate copolymer, or ethylene-methyl acrylate copolymer.

It is to be noted that as the polyolefin resin component in the embodiment, one or more polyolefin resins, which are selected from the group consisting of nonpolar polyolefin resins and polyolefin resins having ester-containing functional groups in side chains thereof, may be used.

In the thermoplastic resin film of the embodiment, the blend amounts of the thermoplastic polyester resin component and the polyolefin resin may preferably be 3 to 30 wt % of a polyolefin resin component to 70 to 97 wt % of the thermoplastic polyester resin component.

If the thermoplastic polyester resin component amounts to less than 70 wt %, film shaving or film peeling occurs during forming when manufacturing containers by using the thermoplastic film, and therefore such a small blend amount is not preferred. If the thermoplastic polyester resin component amounts to more than 97 wt %, preferred impact resistance on the side of an inner wall of the container, which is the problem of the present invention, cannot be obtained, and therefore such a large blend amount is not preferred.

A description will next be made about the shape and dispersion state of the polyolefin resin component in the thermoplastic polyester resin component.

The embodiment is characterized in that the polyolefin resin component is dispersed in a particular shape and direction in the thermoplastic polyester resin component. Described specifically, the polyolefin resin component is characterized in that it is dispersed in a fibrous form in the thermoplastic polyester resin component.

Now, the term "fibrous form" means that in photos presenting cross-sections of a film as in FIG. 1, the polyolefin resin component is in a longer state in a machine direction (MD) of the film (FIG. 1(a)) than in a direction (TD) perpendicular to the machine direction of the film (FIG. 1(b)). Further, in the present invention, the shape of a polyolefin resin component with an aspect ratio of 8 or greater as determined by a calculation method, which will be described subsequently herein, is called "fibrous," while the shape of a polyolefin resin component with an aspect ratio of smaller than 8 is called "particulate."

It is to be noted that the term "machine direction" (MD) can be rephrased as "a longitudinal direction of a film," and also that the term "direction perpendicular to the machine direction of the film" (TD) can be rephrased as "a widthwise direction of the film."

FIG. 2, on the other hand, presents schematic representations illustrated by tracing the photos presented in FIG. 1. Described specifically, FIG. 2 schematically illustrates, based on the photos of FIG. 1, shapes and dispersion states of a polyolefin resin component D in a thermoplastic polyester resin component α.

Specifically, the size of the polyolefin resin dispersed in the resin film of the embodiment is characterized in that an average length in the machine direction of the film is 5 to 300 μm and an average length in a thickness direction of the film is 0.2 to 5 μm.

The shapes and dispersion states of the polyolefin resin as described above are realized as will be described hereinafter. Described specifically, the polyolefin resin can be brought into a stretched fibrous state by adequately adjusting the kneading conditions of the melted resin, the delivery rate of the melted resin from a T-die, the opening of a lip, and the drawing speed at a casting roll when manufacturing the film. In this manner, it has become possible to disperse the polyolefin resin with the above-described shape and size in the polyester resin.

It is to be noted that in the embodiment, an average length of the polyolefin resin, which is smaller than 5 μm in the machine direction, leads to a reduction in formability during manufacture of the container and therefore is not preferred. On the other hand, an average length of the polyolefin resin, which is greater than 300 μm in the machine direction, may lead to a reduction in impact resistance in the direction perpendicular to the machine direction and therefore is not preferred.

It is to be noted that in the embodiment, the above-described term "average length" is defined as will be described hereinafter. Described specifically, after desired cross-sections of a film are cut by a sharp bladed object in the machine direction (MD) of the film and in the direction (TD) perpendicular to the machine direction, the cross-sections are each observed over 1 mm at a desired location in the machine direction or the direction perpendicular to the machine direction under a transmission electron microscope (TEM) or a scanning electron microscope (SEM). The lengths of three polyolefin resin portions are measured in a decreasing order of length, and their average value is recorded as "an average length." Here, the average length in the machine direction of the film is represented by "a," and the average length in the thickness direction of the film as observed on the cross-section in the direction perpendicular to the machine direction of the film is represented by "b." For the calculation of an aspect ratio, these two kinds of average lengths, that is, the values of "a" and "b" are used.

Further, characteristics of the shape of the polyolefin resin dispersed in the resin film of the embodiment include an aspect ratio of 8 or greater. Here, the term "aspect ratio" means the above-described average length in the machine direction of the film relative to the above-described average length in the thickness direction of the film as observed on the cross-sections in the machine direction and the transverse direction of the film of the polyolefin resin.

As a result of a diligent study by the present inventors on the embodiment, it has been found that the setting of the aspect ratio of the polyolefin resin at 8 or greater obtains preferred formability during manufacture of the container. It has also been found that the setting of the aspect ratio at 8 or greater makes an improvement in the adhesion between the metal sheet and the resin film after manufacture of the container.

It is to be noted that no particular limitation is imposed on the upper limit of the aspect ratio insofar as it falls within a range in which the impact resistance on the side of the inner wall of the contained can be sufficiently retained in the machine direction and transverse direction of the resin film.

As a calculation method of an aspect ratio in the embodiment, a value obtained by dividing the average length in the machine direction of the film with the average length in the thickness direction of the film as observed on the cross-section in the direction perpendicular to the machine direction, both of which have been obtained as described above, is specifically employed as the aspect ratio. In other words, using the two kinds of average lengths "a" and "b" obtained as described above, the value of a/b is employed as the "aspect ratio."

As described above, the thermoplastic resin film of the embodiment is based on a technical concept that it has four characteristic features in combination, that is, (1) the polyolefin resin component of the above-described specific kind is dispersed (2) in the specific amount and (3) with the specific size totally different from the above-described conventional techniques, and further (4) with the specific aspect ratio, in the thermoplastic polyester resin component.

In the thermoplastic resin film of the embodiment, the polyolefin resin component of the specific size and specific aspect ratio can therefore exhibit sufficient adhesion force with the thermoplastic polyester resin component without exerting a deleterious effect on formability.

The thermoplastic resin film of the embodiment may be a single-layer film. As an alternative, it may also be a multi-layer film with the above-described blend resin and a different kind of resin laminated together.

In the case of the single-layer film of the above-described blend resin, it is preferred from the viewpoint of the above-described formability and the like to set a film thickness T at 5 to 200 μm. If the film thickness is smaller than 5 μm, the film may be torn after forming so that the base material is exposed to possibly lead to insufficient corrosion resistance. If the film thickness is set greater than 200 μm, on the other hand, the slippability of a can during forming is impaired to raise a problem such as inner wall shaving. From the viewpoint of cost, on the other hand, the thinner the film within an acceptable range, the better, with a range of 5 to 50 μm being more preferred.

In the case of a multilayer film 10 presented in FIG. 3, on the other hand, it may be, for example, a two-layer film as presented in FIG. 3(*a*), or a three-layer film as presented in FIG. 3(*b*). As a further alternative, it may be a film of four or more layers although not presented in any figure.

In the case of the three-layer film, a blend resin layer A may be a middle lamination as presented in FIG. 3(*b*)-1, or the above-described blend resin layer A may be a surface lamination or a bottom lamination as presented in FIG. 3(*b*)-2.

This also applies equally to a case where a film of four or more layers is formed, and any one or more of the layers need to be formed with the above-described blend resin.

In the case of the multilayer film, it is preferred from the viewpoint of the above-described formability and the like to set the film thickness (the total thickness of the multilayer film) T at 5 to 200 μm as presented in FIG. 3. If the film thickness is smaller than 5 μm, the film may be torn after forming so that the base material is exposed to possibly lead to insufficient corrosion resistance. If the film thickness is set greater than 200 μm, on the other hand, the slippability of a can during forming is impaired to raise a problem such as inner wall shaving. From the viewpoint of cost, on the other hand, the thinner the film within an acceptable range, the better, with a range of 5 to 50 μm being more preferred.

Next, a description will hereinafter be made about a manufacturing method of the thermoplastic resin film of the embodiment.

The thermoplastic resin film of the embodiment can be manufactured, for example, by a known method such as that to be described next. Described specifically, pellets of the resins to be blended are heated and melted at a temperature (approximately 200° C. to 300° C.) that is higher by 5° C. to 40° C. than the melting point of the polyester resin having a highest melting point in the used resins. Next, the blended resin is extruded from a T-die of an extruder onto a casing roll, and is cooled and solidified into a film.

The thermoplastic resin film of the embodiment, which has been obtained by a manufacturing method as described above, is characterized in that as mentioned above, the polyolefin resin component is dispersed, in the thermoplastic polyester resin component, in a fibrous form having an average length of 5 to 300 μm in the machine direction of the film, an average length of 0.2 to 5 μm in the thickness direction of the film and an aspect ratio of 8 or greater.

Such shape and dispersion state of the polyolefin resin are realized as will be described hereinafter. Described specifically, the polyolefin resin can be brought into the stretched fibrous state by kneading the melted blend resin under conditions of $Q/N=0.1$ to 2.0, delivering the resin at a predetermined rate from the T-die with the lip thereof adjusted to the opening calculated beforehand, and adequately adjusting the drawing speed at the casting roll when manufacturing the film. In the foregoing, Q means a resin delivery rate (kg/h), and N means a screw rotation speed (rpm) of the extruder. In this manner, it has become possible to disperse the polyolefin resin with above-described shape and size in the polyester resin.

In the manufacturing method of the thermoplastic resin film of the embodiment, the polyolefin resin component is dispersed preferably in a particulate form as presented in FIGS. 1(*c*) and 1(*d*) in a state shortly after the heated and melted resin is delivered from the T-die of the extruder (in the state of a film at the time of flow-down), because no film-stretching force is applied shortly after the melted resin is delivered from the T-die.

The average particle size of the polyolefin resin component presented in FIGS. 1(*c*) and 1(*d*) is preferably from 2 to 10 μm.

[Thermoplastic Resin-coated Metal Sheet]

Next, a description will be made about a thermoplastic resin-coated metal sheet 20 of the embodiment.

As presented in FIG. 4(*a*), the thermoplastic resin-coated metal sheet 20 of the embodiment has a thermoplastic resin layer 200 on at least one side of a metal sheet 100. The thermoplastic resin layer 200 is characterized by including the above-mentioned blend resin layer A. Similar to FIG. 3, it is preferred from the viewpoint of the above-described formability and the like to set, at 5 to 200 μm, the film thickness (the total thickness of the multilayer film) T of the thermoplastic resin layer 200 in FIG. 4. In other words, it is considered that the film thickness T is preferably 5 to 200 μm if the thermoplastic resin layer 200 has a single-layer configuration of the blend resin layer A or the film thickness T as the total film thickness is preferably 5 to 200 μm if the thermoplastic resin layer 200 has a multilayer configuration.

Described specifically, the thermoplastic resin-coated metal sheet 20 of the embodiment may have a thermoplastic resin layer, which is formed of a single layer, on at least one side of the metal sheet 100 as presented in FIG. 4(*a*). As presented in FIG. 4(*b*), on the other hand, the thermoplastic resin-coated metal sheet 20 of the embodiment may also have a thermoplastic resin layer formed from two layers. In addition, the thermoplastic resin-coated metal sheet 20 of the embodiment may also have a thermoplastic resin layer formed from 3 or more layers.

If the thermoplastic resin-coated metal sheet 20 of the embodiment has the thermoplastic resin layer formed from the two layers, the blend resin layer A may be included as a surface lamination (a layer out of contact with the metal sheet 100) and a thermoplastic polyester resin layer of a kind different from the above-described blend resin may be included as a bottom lamination (a layer in contact with the metal sheet 100), as presented in FIG. 4(*b*)-1. As presented in FIG. 4(*b*)-2, on the other hand, the thermoplastic polyester resin layer of the kind different from the above-described blend resin may be included as a surface lamination and the blend resin layer A may be included as a bottom lamination.

If the thermoplastic resin-coated metal sheet 20 of the embodiment has the thermoplastic resin layer formed from the three layers, on the other hand, the blend resin layer A may be included as a surface lamination, as a bottom lamination (a layer in contact with the metal sheet 100), or as a core lamination (a layer sandwiched between the surface lamination and the bottom lamination), although not presented in any figure.

As the metal sheet 100 for use in the thermoplastic resin-coated metal sheet of the embodiment, a known metal sheet useful in general containers such as metal cans can be used, and no particular limitation is imposed thereon. As an example of a preferably usable metal sheet, a surface-treated steel sheet or a light metal sheet such as an aluminum sheet or aluminum alloy sheet can be used.

As the surface-treated steel sheet, aluminum killed steel, low-carbon steel or the like can be used. For example, a cold-rolled steel sheet can be used after subjecting it to annealing and then to secondary cold rolling, and further applying one or more of tin plating, nickel plating, zinc plating, electrolytic chromate treatment, chromate treatment, non-chromate treatment using aluminum or zirconium, and the like.

As the light metal sheet, the aluminum sheet or the aluminum alloy sheet is used. As examples of the aluminum alloy sheet, JIS A3000 series (Al—Mn system) can be used for metal can bodies. For can lids, on the other hand, JIS A5000 series (Al—Mg system) can be used, for example.

It is to be noted that the thickness of such a metal sheet can be selectively determined as desired depending on the purpose of use.

In the thermoplastic resin-coated metal sheet of the embodiment, the thermoplastic resin layer 200 preferably has a thickness T set at 5 to 200 μm from the viewpoint of the formability or the like of the container.

A description will hereinafter be made about a manufacturing method of the thermoplastic resin-coated metal sheet of the embodiment. The thermoplastic resin-coated metal sheet of the embodiment can be manufactured, for example, by a known method such as that to be described hereinafter.

Described specifically, a thermoplastic resin-coated metal sheet with a single resin layer, such as that presented in FIG. 4(*a*), is manufactured by procedures as will be described hereinafter.

First, pellets of the resins to be blended are blended in predetermined blend amounts in a metering mixing machine, and are transferred to an extruder. The blended pellets are heated and melted in an extruder at a temperature (approximately 200° C. to 300° C.) that is higher by 5° C. to 40° C. than the melting point of the polyester resin having the highest melting point in the used resins. The melted blend resin is extruded directly onto an elongated strip-shaped metal sheet, which has been rolled back from an uncoiler, from a T-die via cooling rolls. The resin is pressed against the metal sheet by pressure bonding rolls, and is then immediately quenched in water to prepare the thermoplastic resin-coated metal sheet.

A thermoplastic resin-coated metal sheet with a plurality of resin layers, such as that presented in FIG. 4(*b*), is manufactured as will be described hereinafter. A blend resin and a resin of a kind different from the blend resin are heated and melted in different extruders, respectively, and are then co-extruded directly onto an elongated strip-shaped metal sheet, which has been rolled back from an uncoiler, from a T-die, which has a plurality of die nozzles, via cooling rolls. Thereafter, the resins which have been formed into a plurality of layers are then pressed against the metal sheet by pressure bonding rolls, and are then immediately quenched in water to prepare the thermoplastic resin-coated metal sheet.

In the foregoing, the description is made about the method that extrudes and laminates the resin or resins in a melted state directly onto the metal sheet. As an alternative, the thermoplastic resin-coated metal sheet may be manufactured by fusion-bonding the above-mentioned thermoplastic resin film on a metal sheet. If this is the case, the manufactured film is brought into contact with a heated, elongated strip-shaped metal sheet by using a known laminator, and the film and the metal sheet are nipped and bonded together under pressure between a pair of laminating rolls, followed by immediate quenching in water to prepare the thermoplastic resin-coated metal sheet.

As another alternative, the above-mentioned thermoplastic resin film may be laminated on a metal sheet via an adhesive. If this is the case, a general adhesive can be used as the adhesive. Examples can include polyester based, emulsion type adhesives, polyester urethane resin based, emulsion type adhesives, epoxy-phenol resin based, thermosetting type adhesives, and the like.

[Thermoplastic Resin-Coated Metal Container]

A description will next be made about the thermoplastic resin-coated metal container of the embodiment. In the embodiment, the metal container shall include a can body and a can lid, which are used as a food can or beverage can.

The thermoplastic resin-coated metal container of the embodiment is characterizing by having, on the side of an inner wall thereof, a resin layer formed from a resin (blend resin) prepared by blending the thermoplastic polyester resin and the polyolefin resin together. As the description has already been made about the configuration of the blend resin, its description is omitted here.

In the thermoplastic resin-coated metal container of the embodiment, a heat treatment may be conducted at a temperature of the melting point of the polyester resin ±30° C. for 0.5 to 5 minutes or so after the forming. If this is the case, the thermoplastic resin-coated metal container of the embodiment is characterized in that the polyolefin resin component is dispersed in a particulate form having an average particle size of 2 to 10 μm in the thermoplastic polyester resin component. This heat treatment to be conducted after the forming is effective as a method for allowing the film to restore its adhesion force, but may be omitted depending on the application.

In other words, as mentioned above, the thermoplastic resin film and thermoplastic resin-coated metal sheet of the embodiment are characterized in that the polyolefin resin component contained in the blend resin is dispersed in the fibrous form with the specific size and shape. Described specifically, the size of the dispersed polyolefin resin is characterizing in that the average length is 5 to 300 μm in the machine direction of the film and is 0.2 to 5 μm in the thickness direction of the film. In addition, the dispersed polyolefin resin is also characterized by the aspect ratio of 8 or greater.

By the heat treatment step after the forming of the metal container, the thermoplastic resin layer may be exposed to heat of its softening point or higher. If this is the case, the polyolefin resin dispersed in the fibrous form are changed in size and shape by the heat. Described specifically, the polyolefin resin is considered to return to its size and shape at the time of shortly after the heated and melted resin was delivered from the T-die (in the film at the time of flowdown) when the film was manufactured.

In the thermoplastic resin film and thermoplastic resin-coated metal sheet of the embodiment, the polyolefin resin is dispersed with the coarse size in the fibrous form. This is to increase the surface area of the interface between the polyolefin resin and the polyester resin, thereby resolving the problem of adhesion between both the resins during the severe can-making forming. According to the embodiment, it is also possible to resolve the problem of trimmability on the container manufacturing line.

However, the heat treatment step subsequent to the forming of the metal container is conducted after having gone through the severe forming steps, such as drawing and ironing, and the trimming step, and therefore neither formability nor trimmability is needed for the metal container after subjected to the heat treatment. In other words, after the metal container has been subjected to the heat treatment subsequent to its forming, the dispersed shape of the polyolefin resin is no longer needed to be fibrous.

After the metal container has been subjected to the heat treatment subsequent to its forming, on the other hand, the polyolefin resin is consequently dispersed with an average particle size of 2 to 10 μm in a particulate form in the thermoplastic polyester resin. This is attributed to the fact that the polyolefin resin dispersed in the fibrous form returns to the particulate form (the state confirmed on the film at the time of flow-down) by the heat treatment.

It is to be noted that in the embodiment, the above-described "average particle size" is defined as will be described hereinafter. Described specifically, after desired cross-sections of a film are cut by a sharp bladed object in the machine direction (MD) of the film and in the direction (TD) perpendicular to the machine direction, the cross-sections are each observed over 1 mm at a desired location in the machine direction or the direction perpendicular to the machine direction under a transmission electron microscope (TEM) or a scanning electron microscope (SEM). The lengths of three polyolefin resin portions are measured in a decreasing order of length, and their average value is recorded as "an average length." Here, the average length in the machine direction of the film is represented by "a," and the average length in the thickness direction of the film as observed on the cross-section in the direction perpendicular to the machine direction of the film is represented by "b." As the average particle size, the value of (a+b)/2 (μm) is adopted.

It is also to be noted that the aspect ratio of the polyolefin resin after having been subjected to the heat treatment subsequent to the forming of the metal container is, but is not limited to, approximately 1 to 3 if the two kinds of average lengths "a" and "b" obtained as described above are used and the value of a/b is employed as the "aspect ratio."

It is to be noted that as a manufacturing method of the thermoplastic resin-coated metal container of the embodiment, a known method can be applied. Examples of the known method include drawing, drawing and ironing, stretch drawing-ironing, and the like.

A can lid can be a beverage can lid of what is called the stay-on tab type or an easy-open can lid of what is called the full-open type. As can lids, on the other hand, they can be top and bottom lids for a 3-piece can. These can lids can also be manufactured by a known method.

EXAMPLES

The present invention will hereinafter be described more specifically by examples, although the present invention should not be limited to or by the following examples.

Example 1

[Production of Thermoplastic Resin Film]

Polyethylene terephthalate (homopolymer) and a nonpolar ethylene-propylene (PE-PP) copolymer were provided as a thermoplastic polyester resin component and a polyolefin resin component, respectively. Resin pellets of both the components were mixed together in the proportions presented in Table 1, and the resulting mixed chips were charged into an extruder and were then melted and kneaded there.

As kneading conditions, the kneading temperature was set at 260° C., the ratio Q/N of the delivery rate Q (kg/h) to the extruder screw rpm N (rpm) was set at 0.4, and the residence time in the extruder was set to 20 minutes.

The blend resin heated and melted as described above was extruded from a T-die of an extruder onto a casing roll so that a film thickness of 20 μm was obtained, and was cooled and solidified to obtain a single-layer, thermoplastic resin film.

On the film thus obtained, measurements of disperse diameters of the polyolefin resin component (the average length "a" in the machine direction of the film and the average length "b" in the thickness direction of the film) and a calculation of an aspect ratio were conducted. Described specifically, after desired cross-sections of the film were cut by a sharp bladed object in the machine direction of the film and in the direction perpendicular to the machine direction, the cross-sections were each observed over 1 mm at a desired location in the machine direction or the direction perpendicular to the machine direction under a transmission electron microscope (TEM). The lengths of three polyolefin resin portions were measured in a decreasing order of length, and their average value was recorded as "an average length." Here, the average length in the machine direction of the film was represented by "a," and the average length in the thickness direction of the film as observed on the cross-section in the direction perpendicular to the machine direction of the film was represented by "b." The value of a/b was recorded as the "aspect ratio." It is to be noted that in Example 1, a=80 μm, b=1.5 μm, and aspect ratio=53.3.

The values thus obtained are presented in Table 1. On the other hand, photos illustrating the states of the film cross-sections in Example 1 are presented in FIG. 5. Further, FIG. 6 presents schematic representations illustrated by tracing the photos presented in FIG. 5. Described specifically, FIG. 6 schematically illustrates, based on the photos of FIG. 5, shapes and dispersion states of a polyolefin resin component β in a thermoplastic polyester resin component α in the film cross-sections.

[Evaluation of Impact Resistance]

The thermoplastic resin film obtained as described above was brought into contact with a tin-free steel (TFS) sheet of 0.225 mm thickness heated at a temperature of the resin melting point+30° C., and the thermoplastic resin film and the tin-free steel (TFS) sheet were nipped and bonded together under pressure between a pair of laminating rolls, followed by immediate quenching in water to obtain a thermoplastic resin-coated metal sheet.

Next, the thermoplastic resin-coated metal sheet was subjected to draw and redraw forming with the blend resin layer positioned on the side of an inner wall, whereby the thermoplastic resin-coated metal sheet was formed into a cup with a drawing ratio of 2.3. Water was poured to an upper end portion of the cup thus obtained, and a retort treatment was conducted at 125° C. for 45 minutes.

After a cup body was cut open flat with tinner's snips, a weight of 172 g was dropped from a height of 50 mm onto a punch (tip roundness R: 0.5 mm) at a position, which was equivalent to a height of 40 mm from a bottom of the cup, by using a DuPont impact tester, so that a dent was formed from the side of an outer wall of the cup. It is to be noted that as dent-forming positions, dents were formed at three positions in a rolling direction of the sheet (in a direction of 0°), in a direction at 45° from the rolling direction, and in a direction perpendicular (at 90°) from the rolling direction, respectively.

An enamel rater value (ERV) was then measured at each dented portion on the side of the inner wall of the cup. For the measurement, a solution with a designated electrolyte solution (1% NaCl+a surfactant ("RAPISOL," product of NOF Corporation), 200 mg/L) diluted in ethanol at a ratio of 2:1 was used. After the dented portion was immersed in the electrolyte solution, a voltage of 6.3 V was applied, and a current value was measured 4 seconds after the start of application of the voltage.

From an average value of the ERVs obtained at the three positions (in the directions at 0°, 45°, and 90° from the rolling direction), the impact resistance was evaluated in accordance with the following standards:

E: 0.005 mA or lower
O: Higher than 0.005 mA and 0.05 mA or lower
Δ: Higher than 0.05 mA and 0.5 mA or lower
X: Higher than 0.5 mA The results obtained are presented in Table 1.

[Evaluations of Formability and Trimmability]

To both sides of a thermoplastic resin-coated metal sheet obtained as in the foregoing, paraffin wax was applied at 50 mg/m² per side. The thermoplastic resin-coated metal sheet was next punched in a diameter of 151 mm, and was formed into cup preforms with the blend resin layer positioned on the side of inner walls. By a body maker (B/M), the cup preforms as formed were continuously made at a speed of 200 cpm into as many as 100 drawn and ironed (DI) cans having a reduction rate of 50%. The open end portion of each can so made varied in height in the circumferential direction of the can, and therefore there was a need to make uniform the height of the can. An unnecessary part at the open end was therefore trimmed by a trim cutter. As a consequence, cans (Japanese Agricultural Standards (JAS) can size number: 7) of 66 mm diameter and 102 mm height were made. Evaluations of formability (visual confirmation of existence/non-existence of film shaving on the inner wall) and trimmability (visual confirmation of existence/non-existence of any remaining uncut portion of the unnecessary part at the open end due to a failure in cutting the film) were made.

The above-described formability and trimmability were evaluated in accordance with the following standards:

O: Formability and trimmability are both of a level enabling manufacture by a commercial machine (no shaving on a film on an inner wall thereof, and no remaining uncut portion of the unnecessary part at the open end due to a failure in cutting the film)

Δ: No problem about formability, but poor in trimmability (uncut portion or portions of an unnecessary part remained at an open end due to a failure in cutting a film)

X: Poor in formability (shaving on a film on an inner wall thereof)

The results obtained are presented in Table 1.

[Evaluation of Adhesion after can Making]

To a thermoplastic resin-coated metal sheet obtained as in the foregoing, draw and redraw forming was applied so that the blend resin layer was positioned on the side of an inner wall, whereby the thermoplastic resin-coated metal sheet was formed into a cup with a drawing ratio of 2.3. After a side wall portion of the cup so formed was cut in a T-letter shape at a position and in dimensions presented in FIG. 7(a), the peel strength of the film of 15 mm width was measured by a 180° peel test illustrated in FIG. 7(b). A tensile testing machine was used for the measurement, and the peel strength was measured at room temperature and a stress rate of 5 mm/min.

From the results of the 180° peel test, the adhesion after the can making was also evaluated in accordance with the following standards:

E: Maximum tensile strength of 6 N/15 mm or higher by a tensile testing machine
O: Maximum tensile strength of 3 N/15 mm or higher and lower than 6 N/15 mm by the tensile testing machine
Δ: Maximum tensile strength of 1 N/15 mm or higher and lower than 3 N/15 mm by the tensile testing machine
X: Maximum tensile strength of lower than 1 N/15 mm by the tensile testing machine Evaluation results are presented in Table 1.

[Evaluation of Productivity]

The continuous operability and quality stability during manufacture of the thermoplastic resin film were evaluated as productivity.

Described specifically, a blend resin heated and melted in an extruder was extruded at a delivery rate of 80 kg/h, and was allowed to pass through a nonwoven type resin filter having a filtration accuracy of 20 μm ("F020" FILTER, product of Nagase & Co. Ltd.). In 24-hour continuous operation of the extrusion process, checking was done for any increase in the differential pressure across the filter. If the blend resin gels, clogging is induced in a filter so that the differential pressure across the filter gradually increases.

Further, in a series of steps that the blend resin, which had passed through the filter, was delivered from a T-die of 1500 mm width and was cooled and taken up as a film on a casting roll, the drawing speed of the casting roll was raised stepwise from 50 to 100 mpm, and checking was done for any wavy edges of the film on the casting roll. If the melt tension of a blend resin is low, the higher the speed, the greater the wavy edges, thereby causing variations in film thickness.

From the viewpoints described above, the productivity was evaluated in accordance with the following standards:

O: The increase in differential pressure across a filter is 0.5 MPa or smaller, and at a drawing speed of 100 mpm, wavy edges are small on a casing roll and continuous production is possible.

Δ: The increase in differential pressure across a filter is greater than 0.5 MPa, or at a drawing speed of 100 mpm, wavy edges are significant on a casing roll and continuous production is difficult.

X: The increase in differential pressure across a filter is greater than 0.5 MPa, and at a drawing speed of 100 mpm, wavy edges are significant on a casing roll and continuous production is difficult.

Results are presented in Table 1.

Example 2

A single-layer thermoplastic resin film was obtained as in Example 1 except that as a thermoplastic polyester resin component, a polyethylene terephthalate/isophthalate copolymer (isophthalic acid was copolymerized at 2 mol %) was used.

Respective evaluations of impact resistance, formability and trimmability, adhesion after can making, and productivity were also conducted as in Example 1. The results thus obtained are presented in Table 1.

Example 3

A single-layer thermoplastic resin film was obtained as in Example 1 except that as a thermoplastic polyester resin component, a resin provided by blending a polyethylene terephthalate/isophthalate copolymer (isophthalic acid was copolymerized at 2 mol %) and polybutylene terephthalate (homopolymer) at a ratio of 6:4 was used.

Respective evaluations of impact resistance, formability and trimmability, adhesion after can making, and productivity were also conducted as in Example 1. The results thus obtained are presented in Table 1.

Example 4

Polybutylene terephthalate (homopolymer) and a nonpolar ethylene-propylene (PE-PP) copolymer were provided as a thermoplastic polyester resin component and a polyolefin resin component, respectively. Resin pellets of both the components were mixed together in the proportions presented in Table 1, and the resulting mixed chips were charged into an extruder and were then melted and kneaded there. As kneading conditions, the kneading temperature was set at 250° C., the ratio Q/N of the delivery rate Q (kg/h) to the extruder screw rpm N (rpm) was set at 1.8, and the residence time in the extruder was set to 20 minutes.

Concurrently, polyethylene terephthalate (homopolymer) was heated and melted in another extruder, and the two kinds of heated and melted resins were then extruded from a T-die, which had two flow paths, onto a casting roll so that the PET polymer was laminated as a surface lamination above a blend resin layer. The thickness was controlled so that the surface lamination (PET) was 15 μm thick and the blend resin layer was 5 μm thick.

Next, the extruded resins were immediately cooled and solidified, whereby a two-layer thermoplastic resin film was obtained.

On the film thus obtained, measurements of disperse diameters of the polyolefin resin component and a calculation of an aspect ratio were conducted. Described specifically, after desired cross-sections of the film were cut by a sharp bladed object in the machine direction of the film and in the direction perpendicular to the machine direction, the cross-sections were each observed over 1 mm at a desired location in the machine direction or the direction perpendicular to the machine direction under a transmission electron microscope (TEM). The lengths of three polyolefin resin portions were measured in a decreasing order of length, and their average value was recorded as "an average length." Here, the average length in the machine direction of the film was represented by "a," and the average length in the thickness direction of the film as observed on the cross-section in the direction perpendicular to the machine direction of the film was represented by "b." The value of a/b was recorded as the "aspect ratio." It is to be noted that in Example 4, a=24 μm, b=3.0 μm, and aspect ratio=8.

The values thus obtained are presented in Table 1. On the other hand, photos illustrating the states of the film cross-sections in Example 4 are presented in FIG. 8. Further, FIG. 9 presents schematic representations illustrated by tracing the photos presented in FIG. 8. Described specifically, FIG. 9 schematically illustrates, based on the photos of FIG. 8, shapes and dispersion states of the polyolefin resin component β in the thermoplastic polyester resin component α in the film cross-sections.

Respective evaluations of impact resistance, formability and trimmability, adhesion after can making, and productivity were also conducted as in Example 1. The results thus obtained are presented in Table 1.

Example 5

A two-layer thermoplastic resin film was obtained as in Example 4 except that as a thermoplastic polyester resin component in a blend resin, polyethylene naphthalate (homopolymer) was used in the proportion presented in Table 1, the kneading temperature was set at 280° C., Q/N was set at 0.5, and as a bottom lamination, a polyethylene terephthalate/isophthalate copolymer (isophthalic acid was copolymerized at 15 mol %) was laminated 15 μm thick.

Respective evaluations of impact resistance, formability and trimmability, adhesion after can making, and productivity were also conducted as in Example 1. The results thus obtained are presented in Table 1.

Example 6

As a thermoplastic polyester resin component in a blend resin, a polyethylene terephthalate/isophthalate copolymer (isophthalic acid was copolymerized at 15 mol %) was used in the proportion presented in Table 1, the kneading temperature was set at 260° C., and Q/N was set at 0.4. As a surface lamination above a blend resin layer, on the other hand, a polyethylene terephthalate/isophthalate copolymer (isophthalic acid was copolymerized at 2 mol %) was laminated. The thickness of a film was controlled so that the surface lamination (PET/IA2) was 5 μm thick and the blend resin layer was 15 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 7

As a thermoplastic polyester resin component in a blend resin, a resin provided by blending a polyethylene terephthalate/isophthalate copolymer (isophthalic acid was copolymerized at 2 mol %) and polybutylene terephthalate (homopolymer) at a ratio of 7:3 was used in the proportion presented in Table 1, the kneading temperature was set at 260° C., and Q/N was set at 0.7.

As a surface lamination above a blend resin layer, on the other hand, polyethylene terephthalate (homopolymer) was laminated. The thickness of a film was controlled so that the surface lamination (PET) was 4 μm thick and the blend resin layer was 16 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 8

As a thermoplastic polyester resin component in a blend resin, polyethylene terephthalate (homopolymer) was used in the proportion presented in Table 1, the kneading temperature was set at 270° C., and Q/N was set at 1.0.

As a surface lamination above a blend resin layer, on the other hand, a polyethylene terephthalate/isophthalate copolymer (isophthalic acid was copolymerized at 2 mol %) was used.

The thickness of a film was controlled so that the surface lamination (PET/IA2) was 15 μm thick and the blend resin layer was 5 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 9

As a thermoplastic polyester resin component in a blend resin, a polyethylene terephthalate/isophthalate copolymer (isophthalic acid was copolymerized at 2 mol %) was used in the proportion presented in Table 1, the kneading temperature was set at 260° C., and Q/N was set at 0.6.

As a surface lamination above a blend resin layer, on the other hand, polyethylene naphthalate (PEN) was used.

The thickness of a film was controlled so that the surface lamination (PEN) was 2 μm thick and the blend resin layer was 18 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 10

The blend amount of a polyolefin component in a blend resin was set in the proportion presented in Table 1, the kneading temperature was set at 250° C., and Q/N was set at 1.0. As a bottom lamination underneath a blend resin layer, on the other hand, polyethylene terephthalate/isophthalate copolymer (isophthalic acid was copolymerized at 15 mol %) was used.

The thickness of a film was controlled so that the blend layer was 16 μm thick and the bottom lamination (PET/IA15) was 4 μm thick. As in Example 9 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 11

As a thermoplastic polyester resin component in a blend resin, a polyethylene terephthalate/isophthalate copolymer (isophthalic acid was copolymerized at 2 mol %) was used. As a polyolefin resin component having ester-containing functional groups in side chains thereof, on the other hand, an ethylene-methyl methacrylate copolymer was provided.

Resin pellets of both the components were mixed together in the proportions presented in Table 1, and the resulting mixed chips were charged into an extruder and were then melted and kneaded there. As kneading conditions, the kneading temperature was set at 260° C., the ratio Q/N of the delivery rate Q (kg/h) to the extruder screw rpm N (rpm) was set at 0.8, and the residence time in the extruder was set to 20 minutes.

Concurrently, a polyethylene terephthalate/isophthalate copolymer (isophthalic acid was copolymerized at 2 mol %) was heated and melted in another extruder, and the two kinds of heated and melted resins were then extruded from a T-die, which had two die nozzles, onto a casting roll so that the PET/IA2 polymer was laminated as a surface lamination above a blend resin layer. The thickness was controlled so that the surface lamination (PET/IA2) was 4 μm thick and the blend resin layer was 16 μm thick.

Next, the extruded resins were immediately cooled and solidified, whereby a two-layer thermoplastic resin film was obtained.

Respective evaluations of impact resistance, formability and trimmability, adhesion after can making, and productivity were conducted as in Example 1. The results thus obtained are presented in Table 1.

Example 12

As a thermoplastic polyester resin component in a blend resin, a polyethylene terephthalate/isophthalate copolymer (isophthalic acid was copolymerized at 2 mol %) was used. As a polyolefin resin component having ester-containing functional groups in side chains thereof, on the other hand, an ethylene-ethyl acrylate copolymer was used in the proportion presented in Table 1.

As in Example 11 except for a control of the thickness of a film so that the surface lamination (PET/IA2) was 8 μm thick and the blend resin layer was 12 μm thick, a two-layer thermoplastic resin film was obtained.

Respective evaluations of impact resistance, formability and trimmability, adhesion after can making, and productivity were conducted as in Example 1. The results thus obtained are presented in Table 1.

Example 13

As a polyolefin resin component in a blend resin, a nonpolar linear low-density polyethylene (also called "metallocene-catalyzed PE") was used in the proportion presented in Table 1. As a surface lamination above a blend resin layer, on the other hand, polyethylene terephthalate (homopolymer) was used. As in Example 11 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 14

A two-layer thermoplastic resin film was obtained as in Example 13 except for the blend amount (presented in Table 1) of the linear low-density polyethylene as the polyolefin resin component in the blend resin.

Respective evaluations of impact resistance, formability and trimmability, adhesion after can making, and productivity were conducted as in Example 1. The results thus obtained are presented in Table 1.

Example 15

As a thermoplastic polyester resin component in a blend resin, a resin provided by blending a polyethylene terephthalate/isophthalate copolymer (isophthalic acid was copolymerized at 2 mol %) and polyethylene naphthalate (homopolymer) at a ratio of 7:3 was used. As a polyolefin resin component, nonpolar block polypropylene was used in the proportion presented in Table 1. As in Example 1 except for the foregoing, a two-layer thermoplastic resin film was obtained.

Respective evaluations of impact resistance, formability and trimmability, adhesion after can making, and productivity were conducted as in Example 1. The results thus obtained are presented in Table 1.

Example 16

As a thermoplastic polyester resin component in a blend resin, a polyethylene terephthalate/isophthalate copolymer (isophthalic acid was copolymerized at 2 mol %) was used. As a polyolefin resin component, on the other hand, non-polar block polypropylene was provided.

Resin pellets of both the components were mixed together in the proportions presented in Table 1, and the resulting mixed chips were charged into an extruder and were then melted and kneaded there. As kneading conditions, the kneading temperature was set at 260° C., the ratio Q/N of the delivery rate Q (kg/h) to the extruder screw rpm N (rpm) was set at 0.8, and the residence time in the extruder was set to 20 minutes.

Concurrently, a polyethylene terephthalate/isophthalate copolymer (isophthalic acid was copolymerized at 2 mol %) and a polyethylene terephthalate/isophthalate copolymer (isophthalic acid was copolymerized at 15 mol %) were heated and melted in different extruders. The three kinds of heated and melted resins were then extruded from a T-die, which had three flow paths, onto a casting roll so that the PET/IA2 polymer and the PET/IA15 polymer were laminated as a surface lamination above the blend resin and as a bottom laminate underneath the blend resin, respectively. The thickness was controlled so that the surface lamination (PET/IA2) was 5 μm thick, the blend resin layer was 10 μm thick, and the bottom laminate (PET/IA15) was 5 μm thick, whereby a three-layer thermoplastic resin film was obtained.

Example 17

As a thermoplastic polyester resin component in a blend resin, a resin provided by blending a polyethylene terephthalate/isophthalate copolymer (isophthalic acid was copolymerized at 2 mol %) and polybutylene terephthalate (homopolymer) at a ratio of 9:1 was used in the proportion presented in Table 1, the kneading temperature was set at 250° C., and Q/N was set at 0.2. As in Example 1 except for the foregoing, a single-layer thermoplastic resin film was obtained.

Respective evaluations of impact resistance, formability and trimmability, adhesion after can making, and productivity were conducted as in Example 1. The results thus obtained are presented in Table 1.

Example 18

A single-layer thermoplastic resin film was obtained as in Example 17 except that as a thermoplastic polyester resin component in a blend resin, a resin provided by blending a polyethylene terephthalate/isophthalate copolymer (isophthalic acid was copolymerized at 2 mol %) and polybutylene terephthalate (homopolymer) at a ratio of 19:1 was used in the proportion presented in Table 1.

Respective evaluations of impact resistance, formability and trimmability, adhesion after can making, and productivity were conducted as in Example 1. The results thus obtained are presented in Table 1.

Comparative Example 1

A two-layer thermoplastic resin film was obtained without any blend resin layer. A surface lamination was extruded using a polyethylene terephthalate/isophthalate copolymer (isophthalic acid was copolymerized at 2 mol %), and a bottom lamination was extruded using a polyethylene terephthalate/isophthalate copolymer (isophthalic acid was copolymerized at 15 mol %). The thickness of the film was controlled so that the surface lamination was 11 μm thick and the bottom lamination was 9 μm thick.

Respective evaluations of impact resistance, formability and trimmability, adhesion after can making, and productivity were conducted as in Example 1. The results thus obtained are presented in Table 2.

Comparative Example 2

As a thermoplastic polyester resin component in a blend resin, a polyethylene terephthalate/isophthalate copolymer (isophthalic acid was copolymerized at 5 mol %) was used. As a polyolefin resin component, an ionomer having polar groups ("HIMILAN," trade name, product of Du Pont-Mitsui Petrochemicals Co., Ltd.) was used in the proportion presented in Table 2. As kneading conditions, the kneading temperature was set at 265° C., and Q/N was set at 0.8.

As a surface lamination in a blend resin layer, on the other hand, polyethylene terephthalate (homopolymer) was used. The thickness of a film was controlled so that the surface lamination was 4 μm thick and the blend resin layer was 16 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 2.

Comparative Example 3

A single-layer thermoplastic resin film was obtained as in Example 2 except that the blend amount of the PE-PP copolymer as the polyolefin resin component in the blend resin was changed as presented in Table 2.

Respective evaluations of impact resistance, formability and trimmability, adhesion after can making, and productivity were conducted as in Example 1. The results thus obtained are presented in Table 2.

Comparative Example 4

As a thermoplastic polyester resin component in a blend resin, a resin provided by blending a polyethylene terephthalate/isophthalate copolymer (isophthalic acid was copolymerized at 2 mol %) and polybutylene terephthalate (homopolymer) at a ratio of 6:4 was used in the proportion presented in Table 2. As kneading conditions, the kneading temperature was set at 260° C., and Q/N was set at 0.2.

As a surface lamination above a blend resin layer, on the other hand, a polyethylene terephthalate/isophthalate copolymer (isophthalic acid was copolymerized at 2 mol %) was laminated.

As in Example 7 except for the foregoing, a two-layer thermoplastic resin film was obtained.

Respective evaluations of impact resistance, formability and trimmability, adhesion after can making, and productivity were conducted as in Example 1. The results thus obtained are presented in Table 2.

Comparative Example 5

A two-layer thermoplastic resin film was obtained as in Example 10 except that in the blend resin, the blend amount of the PE-PP copolymer as the polyolefin resin component was changed as presented in Table 2.

Respective evaluations of impact resistance, formability and trimmability, adhesion after can making, and productivity were conducted as in Example 1. The results thus obtained are presented in Table 2.

Comparative Example 6

As a thermoplastic polyester resin component in a blend resin, a polyethylene terephthalate/isophthalate copolymer (isophthalic acid was copolymerized at 2 mol %) was used. The blend amount of the polyolefin resin component was changed to the value presented in Table 2.

As a surface lamination above a blend resin layer, on the other hand, polyethylene terephthalate (homopolymer) was laminated. The thickness of a film was controlled so that the surface lamination (PET) was 10 μm thick and the blend resin layer was 10 μm thick. As in Example 4 except for the foregoing, a two-layer thermoplastic resin film was obtained.

Respective evaluations of impact resistance, formability and trimmability, adhesion after can making, and productivity were conducted as in Example 1. The results thus obtained are presented in Table 2.

TABLE 1

| | Blend resin | | | | | | Thickness of blend resin layer (μm) | Configuration of thermoplastic resin film | | | Evaluation results | | | |
|---|---|---|---|---|---|---|---|---|---|---|---|---|---|---|
| | Thermoplastic polyester resin Component | Polyolefin resin | | | | | | | | | | Formability & trimmability | Adhesion after can making | |
| | | Component | Blend amount (wt %) | Average length a (μm) | b (μm) | Aspect ratio a ÷ b | Dispersion state | | Surface layer | Lower layer | Layer configuration | Impact resistance | | | Productivity |
| Ex. 1 | PET | PE-PP copolymer | 10 | 80 | 1.5 | 53.3 | Fibrous | 20 | None | None | Single layer | O | O | E | O |
| Ex. 2 | PET/IA2 | PE-PP copolymer | 10 | 60 | 2 | 30 | Fibrous | 20 | None | None | Single layer | O | O | E | O |
| Ex. 3 | PET/IA2:PBT = 6:4 blend | PE-PP copolymer | 10 | 230 | 1 | 230 | Fibrous | 20 | None | None | Single layer | O | O | E | O |
| Ex. 4 | PBT | PE-PP copolymer | 10 | 24 | 3 | 8 | Fibrous | 5 | PET 15 μm | None | Two-layer | O | O | O | O |
| Ex. 5 | PEN | PE-PP copolymer | 5 | 60 | 2 | 30 | Fibrous | 5 | None | PET/IA2 15 μm | Two-layer | O | O | E | O |
| Ex. 6 | PET/IA15 | PE-PP copolymer | 7 | 90 | 1.5 | 60 | Fibrous | 15 | PET/IA2 5 μm | None | Two-layer | O | O | E | O |
| Ex. 7 | PET/IA2:PBT = 7:3 blend | PE-PP copolymer | 20 | 230 | 1 | 230 | Fibrous | 16 | PET 4 μm | None | Two-layer | E | O | E | O |
| Ex. 8 | PET | PE-PP copolymer | 30 | 60 | 2 | 30 | Fibrous | 5 | PET/IA2 15 μm | None | Two-layer | O | O | O | O |
| Ex. 9 | PET/IA2 | PE-PP copolymer | 10 | 60 | 2 | 30 | Fibrous | 18 | PET 2 μm | None | Two-layer | O | O | E | O |
| Ex. 10 | PET/IA2 | PE-PP copolymer | 3 | 90 | 1.5 | 60 | Fibrous | 16 | None | PET/IA2 4 μm | Two-layer | O | O | E | O |
| Ex. 11 | PET/IA2 | Ethylene-methyl methacrylate copolymer | 10 | 60 | 2 | 30 | Fibrous | 16 | PET/IA2 4 μm | None | Two-layer | O | O | E | O |
| Ex. 12 | PET/IA2 | Ethylene-ethyl acrylate copolymer | 10 | 60 | 2 | 30 | Fibrous | 12 | PET/IA2 8 μm | None | Two-layer | O | O | E | O |
| Ex. 13 | PET/IA2 | Metallocene-catalyzed PE | 10 | 230 | 1 | 230 | Fibrous | 16 | PET 4 μm | None | Two-layer | O | O | E | O |
| Ex. 14 | PET/IA2 | Metallocene-catalyzed PE | 15 | 280 | 0.8 | 350 | Fibrous | 16 | PET 4 μm | None | Two-layer | E | O | E | O |

TABLE 1-continued

| | Thermoplastic polyester resin Component | Blend resin | | | | | Thickness of blend resin layer (μm) | Configuration of thermoplastic resin film | | | Evaluation results | | | |
|---|---|---|---|---|---|---|---|---|---|---|---|---|---|---|
| | | Polyolefin resin | | | | | | | | | Impact resistance | Formability & trimmability | Adhesion after can making | Productivity |
| | | Component | Blend amount (wt %) | Average length a (μm) | b (μm) | Aspect ratio a ÷ b | Dispersion state | | Surface layer | Lower layer | Layer configuration | | | | |
| Ex. 15 | PET/IA2: PEN = 7:3 blend | Block PP | 10 | 90 | 1.5 | 60 | Fibrous | 20 | None | None | Single layer | O | O | E | O |
| Ex. 16 | PET/IA2 | Block PP | 10 | 90 | 1.5 | 60 | Fibrous | 10 | PET/IA2 5 μm | PET/IA2 5 μm | Three layer | O | O | E | O |
| Ex. 17 | PET/IA2: PBT = 9:1 blend | PE-PP copolymer | 10 | 8 | 0.5 | 16 | Fibrous | 20 | None | None | Single layer | E | O | E | O |
| Ex. 18 | PET/IA2: PBT = 19:1 blend | PE-PP copolymer | 5 | 5 | 0.2 | 25 | Fibrous | 20 | None | None | Single layer | O | O | E | O |

TABLE 2

| | Thermoplastic polyester resin Component | Blend resin | | | | | Thickness of blend resin layer (μm) | Configuration of thermoplastic resin film | | | Evaluation results | | | |
|---|---|---|---|---|---|---|---|---|---|---|---|---|---|---|
| | | Polyolefin resin | | | | | | | | | Impact resistance | Formability & trimmability | Adhesion after can making | Productivity |
| | | Component | Blend amount (wt %) | Average length a (μm) | b (μm) | Aspect ratio a ÷ b | Dispersion state | | Surface layer | Lower layer | Layer configuration | | | | |
| Comp. Ex. 1 | — | — | — | — | — | — | — | 0 | PET/IA2 11 μm | PET/IA15 9 μm | Two-layer | X | Δ | O | O |
| Comp. Ex. 2 | PET/IA5 | Ionomer | 18 | 3.6 | 0.3 | 12 | Fibrous | 16 | PET 4 μm | None | Two-layer | E | O | O | X |
| Comp. Ex. 3 | PET/IA2 | PE-PP copolymer | 15 | 16 | 4 | 4 | Particulate | 20 | None | None | Single layer | E | X | O | O |
| Comp. Ex. 4 | PET/IA2: PBT = 6:4 blend | PE-PP copolymer | 15 | 10 | 5 | 2 | Particulate | 16 | PET/IA2 4 μm | None | Two-layer | E | X | Δ | O |
| Comp. Ex. 5 | PET/IA2 | PE-PP copolymer | 2 | 60 | 2 | 30 | Fibrous | 16 | None | PET/IA15 4 μm | Two-layer | X | Δ | O | O |
| Comp. Ex. 6 | PET/IA2 | PE-PP copolymer | 35 | 90 | 1.5 | 60 | Fibrous | 10 | PET 10 μm | None | Two-layer | E | X | Δ | O |

According to Tables 1 and 2, it is evident that the thermoplastic resin films, thermoplastic resin-coated metal sheets and thermoplastic resin-coated metal containers of the embodiment are excellent in each of impact resistance, formability and trimmability, adhesion after can making, and productivity.

Comparative Example 1 is an example of a case in which no polyolefin resin component is contained in a polyester resin. According to Comparative Example 1, impact resistance is insufficient. As a consequence, a film may crack due to deformation or the like of a can, which may occur after forming beads on a container manufacturing line or after filling. Comparative Example 1 therefore resulted in unfavorable impact resistance. In addition, due to the existence of no polyolefin resin dispersed in a fibrous form, the film was hard to be cut, resulting in the occurrence of a trimming failure that an unnecessary part at an open end remained uncut due to a failure in cutting the film in a trimming step conducted after forming.

Comparative Example 2 is an example of a case in which a resin having polar groups is blended as a polyolefin resin component in a blend resin. According to Comparative Example 2, the polyolefin resin reacts with a thermoplastic polyester resin so that excellent impact resistance and formability are exhibited.

However, reaction products may be formed during formation of a resin film, thereby possibly causing a serious defect in quality and a reduction in production yield. Comparative Example 2 therefore resulted in unfavorable productivity.

Comparative Examples 3 and 4 are examples of a case in which the aspect ratio of a polyolefin resin component dispersed in a fibrous form in a thermoplastic polyester resin is smaller than 8. According to Comparative Examples 3 and 4, the polyolefin resin has a small surface area in the thermoplastic polyester resin, and therefore the interfacial adhesin force between both the resins is insufficient. Hence, film shaving occurred during the draw and redraw forming, resulting in unfavorable formability.

Comparative Example 5 is an example of a case in which the blend amount of a polyolefin resin is small in a blend resin.

According to Comparative Example 5, the blend amount of the polyolefin resin in the blend resin was 3 wt %, resulting in unfavorable impact resistance.

Comparative Example 6 is an example of a case in which the blend amount of a polyolefin resin is large in a blend resin.

According to Comparative Example 6, the blend amount of the polyolefin resin in the blend resin was greater than 30 wt %, and therefore film shaving occurred during the draw and redraw forming, resulting in unfavorable formability.

Examples 19 to 26

[Observation of Dispersion States of Polyolefin Resin Before and After Heat Treatment]

Using the thermoplastic resin-coated metal sheets obtained in Examples 1 to 6, Example 16 and Example 17, cup bodies (drawn and redrawn cups with a drawing ratio of 2.3) were made.

Each thermoplastic resin-coated metal sheet was next subjected to a heat treatment under the conditions presented in Table 3. The temperature of the heat treatment was set to fall within the range of the melting point of the polyester resin component in the blend resin ±30° C. If two kinds of polyester resin components were used, the temperature of the heat treatment was set to fall within the range of the melting point of the resin of a higher melting point ±30° C.

Using each container before or after the heat treatment, the disperse diameters of the polyolefin resin in the resin layer on the side of the inner surface of the bottom wall (a planar portion) was measured, and the aspect ratio and average particle size of the polyolefin resin were calculated. Described specifically, after desired cross-sections of the film were cut by a sharp bladed object in the machine direction and in the direction perpendicular to the machine direction, the cross-sections were each observed over 1 mm at a desired location in the machine direction or the direction perpendicular to the machine direction under a transmission electron microscope (TEM). The lengths of three polyolefin resin portions were measured in a decreasing order of length, and their average value was recorded as "an average length." At that time, the average length in the machine direction of the film was represented by "a," and the average length in the thickness direction of the film as observed on the cross-section in the direction perpendicular to the machine direction of the film was represented by "b." The value of a/b was adopted as "the aspect ratio."

By the observation of the cross-sections under TEM, it was possible to confirm that before the heat treatment, the polyolefin resin was dispersed in a fibrous form having an aspect ratio of 8 or greater while after the heat treatment, the polyolefin resin was dispersed in a particulate form having an average particle size of 2 to 10 μm. The thus-acquired average particle size of the polyolefin resin is presented in Table 3.

In addition, the can bodies after the heat treatment were evaluated in terms of impact resistance and adhesion after can making in the same manner as in Example 1. The results are presented in Table 3. On the other hand, photos illustrating the states of the film cross-sections in Example 24 are presented in FIG. 10. Further, FIG. 11 presents schematic representations illustrated by tracing the photos presented in FIG. 10. Described specifically, FIG. 11 schematically illustrates, based on the photos of FIG. 10, shapes and dispersion states of the polyolefin resin component β in the thermoplastic polyester resin component α.

TABLE 3

| | Blend resin | | | | | | Thickness of blend resin layer (μm) | Configuration of thermoplastic resin film | | | Evaluation results | | | |
|---|---|---|---|---|---|---|---|---|---|---|---|---|---|---|
| | Thermoplastic polyester resin Component | Polyolefin resin | | | | | | | | | Impact resistance | Formability & trimmability | Adhesion after can making | Productivity |
| | | Component | Blend amount (wt %) | Average length | | Aspect ratio a + b | Dispersion state | | Surface layer | Lower layer | Layer configuration | | | | |
| | | | | a (μm) | b (μm) | | | | | | | | | | |
| Ex. 1 | PET | PE-PP copolymer | 10 | 80 | 1.5 | 53.3 | Fibrous | 20 | None | None | Single layer | O | O | E | O |
| Ex. 2 | PET/IA2 | PE-PP copolymer | 10 | 60 | 2 | 30 | Fibrous | 20 | None | None | Single layer | O | O | E | O |

TABLE 3-continued

| | Blend resin | | | | | | Thickness of blend resin layer (μm) | Configuration of thermoplastic resin film | | | Evaluation results | | | |
|---|---|---|---|---|---|---|---|---|---|---|---|---|---|---|
| | Thermoplastic polyester resin Component | Polyolefin resin | | | | | | | | | Impact resistance | Formability & trimmability | Adhesion after can making | Productivity |
| | | Component | Blend amount (wt %) | Average length a (μm) | b (μm) | Aspect ratio a + b | Dispersion state | | Surface layer | Lower layer | Layer configuration | | | | |
| Ex. 3 | PET/IA2: PBT = 6:4 blend | PE-PP copolymer | 10 | 230 | 1 | 230 | Fibrous | 20 | None | None | Single layer | O | O | E | O |
| Ex. 4 | PBT | PE-PP copolymer | 10 | 24 | 3 | 8 | Fibrous | 5 | PET 15 μm | None | Two-layer | O | O | O | O |
| Ex. 5 | PEN | PE-PP copolymer | 5 | 60 | 2 | 30 | Fibrous | 5 | None | PET/IA2 15 μm | Two-layer | O | O | E | O |
| Ex. 6 | PET/IA15 | PE-PP copolymer | 7 | 90 | 1.5 | 60 | Fibrous | 15 | PET/IA2 5 μm | None | Two-layer | O | O | E | O |
| Ex. 7 | PET/IA2: PBT = 7:3 blend | PE-PP copolymer | 20 | 230 | 1 | 230 | Fibrous | 16 | PET 4 μm | None | Two-layer | E | O | E | O |
| Ex. 8 | PET | PE-PP copolymer | 30 | 60 | 2 | 30 | Fibrous | 5 | PET/IA2 15 μm | None | Two-layer | O | O | O | O |
| Ex. 9 | PET/IA2 | PE-PP copolymer | 10 | 60 | 2 | 30 | Fibrous | 18 | PET 2 μm | None | Two-layer | O | O | E | O |
| Ex. 10 | PET/IA2 | PE-PP copolymer | 3 | 90 | 1.5 | 60 | Fibrous | 16 | None | PET/IA2 4 μm | Two-layer | O | O | E | O |
| Ex. 11 | PET/IA2 | Ethylene-methyl methacrylate copolymer | 10 | 60 | 2 | 30 | Fibrous | 16 | PET/IA2 4 μm | None | Two-layer | O | O | E | O |
| Ex. 12 | PET/IA2 | Ethylene-ethyl acrylate copolymer | 10 | 60 | 2 | 30 | Fibrous | 12 | PET/IA2 8 μm | None | Two-layer | O | O | E | O |
| Ex. 13 | PET/IA2 | Metallocene-catalyzed PE | 10 | 230 | 1 | 230 | Fibrous | 16 | PET 4 μm | None | Two-layer | O | O | E | O |
| Ex. 14 | PET/IA2 | Metallocene-catalyzed PE | 15 | 280 | 0.8 | 350 | Fibrous | 16 | PET 4 μm | None | Two-layer | E | O | E | O |
| Ex. 15 | PET/IA2: PEN = 7:3 blend | Block PP | 10 | 90 | 1.5 | 60 | Fibrous | 20 | None | None | Single layer | O | O | E | O |
| Ex. 16 | PET/IA2 | Block PP | 10 | 90 | 1.5 | 60 | Fibrous | 10 | PET/IA2 5 μm | PET/IA2 5 μm | Three layer | O | O | E | O |
| Ex. 17 | PET/IA2: PBT = 9:1 blend | PE-PP copolymer | 10 | 8 | 0.5 | 16 | Fibrous | 20 | None | None | Single layer | E | O | E | O |
| Ex. 18 | PET/IA2: PBT = 19:1 blend | PE-PP copolymer | 5 | 5 | 0.2 | 25 | Fibrous | 20 | None | None | Single layer | O | O | E | O |

According to the results of Examples 19 to 26, it has been successfully confirmed that the shape of the polyolefin resin dispersed in the resin changes from a fibrous form to a particulate form by applying the heat treatment to the thermoplastic resin-coated metal sheet. The interfacial adhesion between the thermoplastic polyester resin component and the polyolefin resin component is considered to decrease because the surface area of the polyolefin resin decreases due to the change to the particulate form.

There is, however, no concern with occurrence of a problem about formability because the thermoplastic resin-coated metal sheet is already in the state after the formation of the container. It is also evident from the results presented in Table 3 that neither impact resistance nor adhesion is reduced by the change in the shape of the polyolefin resin component.

It is a known practice for an improvement in the adhesion of a film after its forming to conduct a heat treatment at a temperature of the melting point of its resin ±30° C.

According to the results of Examples 19 to 26, it has been successfully confirmed that, although the dispersion state of the polyolefin resin component changes from the fibrous state to the particulate state through the heat treatment, the characteristics of the thermoplastic resin-coated metal sheet as a can body are not affected, and therefore the thermoplastic resin-coated metal sheet is usable in practice.

It has hence been successfully confirmed that it is until before formation of a can body that the olefin resin needs to remain dispersed in a fibrous form.

INDUSTRIAL APPLICABILITY

According to the present invention, it is possible to provide a thermoplastic resin film, which have impact resistance, formability and trimmability, adhesion after can making, productivity and the like all together, a thermoplastic resin-coated metal sheet, and a metal container using them.

Thermoplastic resin films and thermoplastic resin-coated metal sheets according to the present invention can be applied not only as beverage cans or food cans, but also as square cans, 18 L square cans, drum cans, pouches, metal cases for batteries and the like, and also as exterior walls of buildings or automotive vehicles, and therefore have extremely high industrial applicability.

REFERENCE SIGNS LIST

10 Multilayer film
20 Thermoplastic resin-coated metal sheet
100 Metal sheet
200 Thermoplastic resin layer
A Blend resin layer
α Thermoplastic polyester resin component
β Polyolefin resin component

The invention claimed is:

1. A thermoplastic resin-coated metal sheet comprising:
   a metal sheet and a thermoplastic resin film laminated on at least one side of the metal sheet,
   wherein the thermoplastic resin film contains 70 to 97 wt % of a thermoplastic polyester resin component and 3 to 30 wt % of a polyolefin resin component,
   wherein the polyolefin resin component contains one or more polyolefin resins selected from a group consisting of nonpolar polyolefin resins and polyolefin resins having ester-containing functional groups in side chains of the groups,
   wherein the polyolefin resin component is dispersed, in the thermoplastic polyester resin component, in a fibrous form having an average length of 5 to 300 μm in a machine direction of the film, an average length of 0.2 to 5 μm in a thickness direction of the film, and an aspect ratio of 8 or greater, and
   wherein the aspect ratio is defined as "a/b", with "a" representing the average length in the machine direction of the film, and "b" representing the average length in the thickness direction of the film.

2. The thermoplastic resin-coated metal sheet according to claim 1, wherein the nonpolar polyolefin resins are any of polyethylene, polypropylene, and ethylene-propylene copolymer.

3. The thermoplastic resin-coated metal sheet according to claim 1, wherein the polyolefin resins having the ester-containing functional groups in the side chains of the groups are any of ethylene-methyl methacrylate copolymer, ethylene-ethyl acrylate copolymer, and ethylene-methyl acrylate copolymer.

4. The thermoplastic resin-coated metal sheet according to claim 1, wherein the thermoplastic polyester resin contains one or more of polyethylene terephthalate (PET), polyethylene terephthalate/isophthalate copolymer (PET/IA), polybutylene terephthalate (PBT), and polyethylene naphthalate (PEN).

5. The thermoplastic resin-coated metal sheet according to claim 1, further comprising:
   on at least one side of the thermoplastic resin film, a thermoplastic polyester resin layer of a kind different from the thermoplastic resin film.

6. A thermoplastic resin-coated metal container comprising:
   a thermoplastic resin layer on a side of at least an inner wall of the container,
   wherein the thermoplastic resin layer contains 70 to 97 wt % of a thermoplastic polyester resin component and 3 to 30 wt % of a polyolefin resin component,
   wherein the polyolefin resin component includes one or more polyolefin resins selected from a group consisting of nonpolar polyolefin resins and polyolefin resins having ester-containing functional groups in side chains of the groups,
   wherein the polyolefin resin component is dispersed, in the thermoplastic polyester resin component, in a fibrous form having an average length of 5 to 300 μm in a machine direction of the film, an average length of 0.2 to 5 μm in a thickness direction of the film, and an aspect ratio of 8 or greater, and
   wherein the aspect ratio is defined as "a/b", with "a" representing the average length in the machine direction of the film, and "b" representing the average length in the thickness direction of the film.

7. The thermoplastic resin-coated metal container according to claim 6, wherein at least a portion of the polyolefin resin component is dispersed in a particulate form having an average particle size of 2 to 10 μm and an aspect ratio of 1 to 3 in the thermoplastic polyester resin component, and wherein the average particle size is defined as "(a+b)/2".

* * * * *